US010605650B2

(12) United States Patent
Hatcho et al.

(10) Patent No.: US 10,605,650 B2
(45) Date of Patent: Mar. 31, 2020

(54) LOAD DETECTOR, LOAD DETECTION KIT, AND LOAD DETECTION SYSTEM

(71) Applicant: Minebea Mitsumi Inc., Nagano (JP)

(72) Inventors: Jun Hatcho, Kitasaku-gun (JP); Toshio Kuroiwa, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/394,460

(22) Filed: Apr. 25, 2019

(65) Prior Publication Data

US 2019/0250027 A1 Aug. 15, 2019

Related U.S. Application Data

(63) Continuation of application No. PCT/JP2017/037845, filed on Oct. 19, 2017.

(30) Foreign Application Priority Data

Oct. 28, 2016 (JP) .................................. 2016-211494

(51) Int. Cl.
*G01G 21/22* (2006.01)
*G01G 19/02* (2006.01)
(Continued)

(52) U.S. Cl.
CPC ............... *G01G 21/22* (2013.01); *A61G 7/05* (2013.01); *G01G 19/027* (2013.01); *G01G 19/44* (2013.01); *G01G 19/52* (2013.01); *G01G 21/18* (2013.01)

(58) Field of Classification Search
CPC .... G01G 3/1412; G01G 19/445; G01G 21/28; G01G 23/012; G01G 19/027;
(Continued)

(56) References Cited

U.S. PATENT DOCUMENTS 4,558,757 A * 12/1985 Mori ..................... G06F 3/0414
177/199
4,632,198 A * 12/1986 Uchimura ............... G01G 21/24
177/211
(Continued)

FOREIGN PATENT DOCUMENTS

CN 101147179 A 3/2008
CN 101472545 A 7/2009
(Continued)

OTHER PUBLICATIONS

Written for International Application No. PCT/JP2017/037845 dated Nov. 14, 2017 and English translation.
(Continued)

*Primary Examiner* — Randy W Gibson
(74) *Attorney, Agent, or Firm* — Pearne & Gordon LLP

(57) ABSTRACT

There is provided a load detector including: first and second beam-type load cells which are supported on first and second support bases, respectively, in a cantilever manner; a placement part on which a rolling body is to be placed, and which includes first and second connection parts connected to the first and second beam-type load cells, respectively, and a pair of walls, the placement part being disposed between the first and second beam-type load cells; and a restriction member which is detachably attached to at least one of the pair of walls, and which is configured to restrict a posture of the rolling body on the placement part. The first connection part is connected to the first beam-type load cell on a side of the free end and the second connection part is connected to the second beam-type load cell on a side of the free end.

8 Claims, 15 Drawing Sheets

(51) Int. Cl.
　　　*G01G 19/18* (2006.01)
　　　*G01G 19/52* (2006.01)
　　　*G01G 19/44* (2006.01)
　　　*A61G 7/05* (2006.01)
　　　*G01G 21/18* (2006.01)

(58) Field of Classification Search
　　　CPC ........ G01G 19/52; G01G 21/18; G01G 19/44;
　　　　　　　　　　　　　　　　　A01G 7/0527; A01G 7/05
　　　See application file for complete search history.

(56) References Cited

U.S. PATENT DOCUMENTS

| | | | | |
|---|---|---|---|---|
| 4,711,314 | A * | 12/1987 | Suzuki | G01G 3/1412 177/164 |
| 5,086,856 | A * | 2/1992 | Haggstrom | G01G 19/445 177/1 |
| 5,367,129 | A * | 11/1994 | Lahl, Jr. | A63B 47/008 177/229 |
| 5,414,225 | A * | 5/1995 | Garfinkle | G01G 19/021 177/127 |
| 5,646,375 | A * | 7/1997 | Neuman | G01G 3/1412 177/229 |
| 5,994,649 | A * | 11/1999 | Garfinkle | G01G 19/44 177/126 |
| 6,380,496 | B1 * | 4/2002 | Lohkamp | G01G 19/445 177/144 |
| 6,875,932 | B2 * | 4/2005 | Tuft | G01G 19/44 177/144 |
| 8,279,057 | B2 | 10/2012 | Hirose | |
| 10,010,467 | B2 * | 7/2018 | Sato | A61G 7/0527 |
| 2008/0272137 | A1 | 11/2008 | Fitzgerald et al. | |
| 2009/0051549 | A1 | 2/2009 | Tochigi et al. | |
| 2010/0231376 | A1 | 9/2010 | Hirose | |
| 2015/0122555 | A1 | 5/2015 | Meeks et al. | |
| 2016/0081592 | A1 | 3/2016 | Ishikawa et al. | |
| 2019/0015015 | A1 * | 1/2019 | Sato | A61B 5/1115 |

FOREIGN PATENT DOCUMENTS

| | | |
|---|---|---|
| CN | 105246446 A | 1/2016 |
| JP | 2005-300368 A | 10/2005 |
| JP | 2006-058035 A | 3/2006 |
| JP | 4002905 B2 | 11/2007 |
| JP | 4109230 B2 | 7/2008 |
| JP | 4120094 B2 | 7/2008 |
| JP | 4879620 B2 | 2/2012 |
| JP | 6082487 B2 | 2/2017 |
| JP | 6097966 B1 | 3/2017 |
| WO | 2006/101275 A1 | 9/2006 |

OTHER PUBLICATIONS

International Search Report for International Application No. PCT/JP2017/0037845 dated Nov. 14, 2017.
Decision to Grant a Patent dated Jan. 30, 2018 for corresponding Japanese Application No. 2016-211494.
Extended European Search Report dated Sep. 18, 2019 for corresponding European Application No. 17866225.0.
Chinese Office Action dated Sep. 12, 2019 for corresponding Chinese Application No. 201780066232.9 and English translation.

* cited by examiner

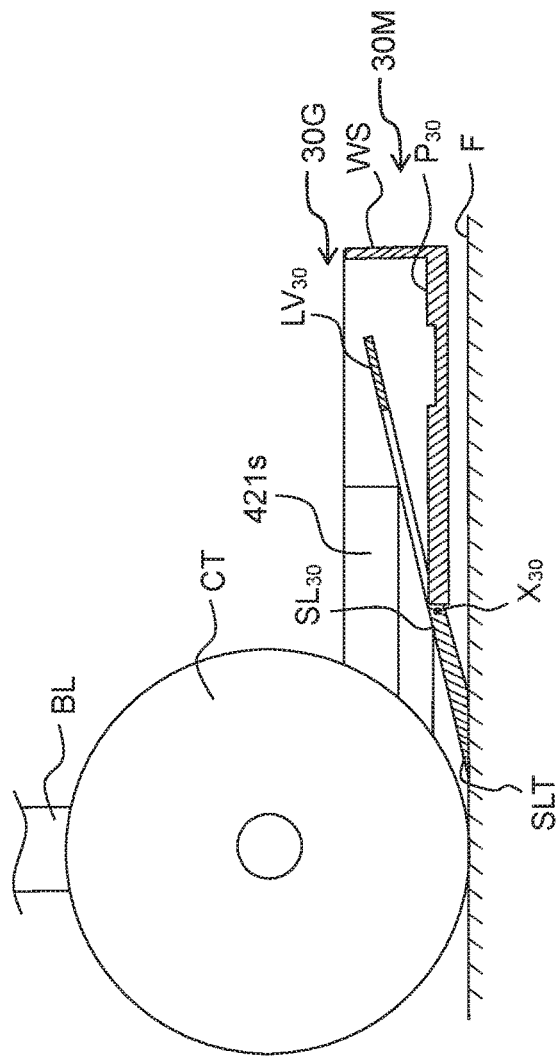
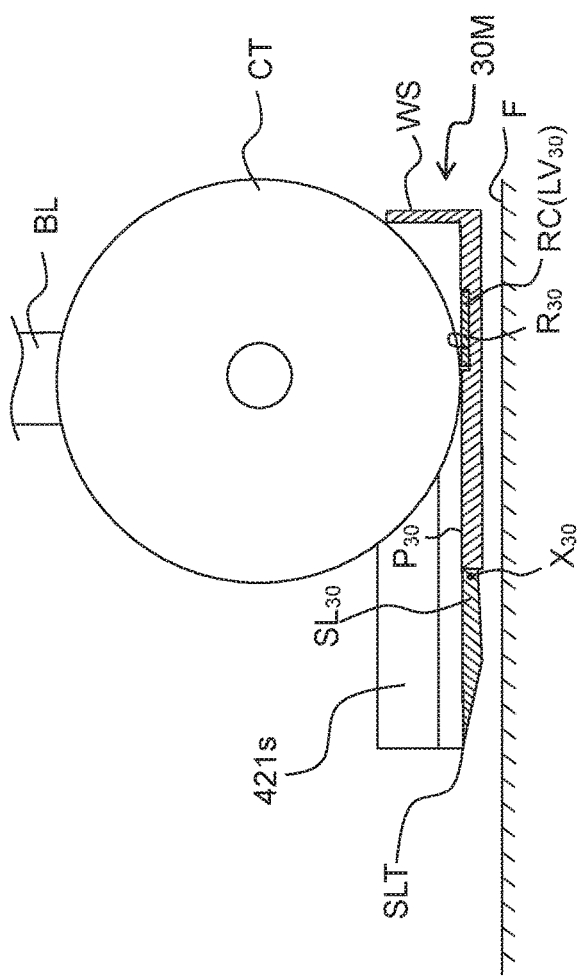
Fig. 4A
Fig. 4B

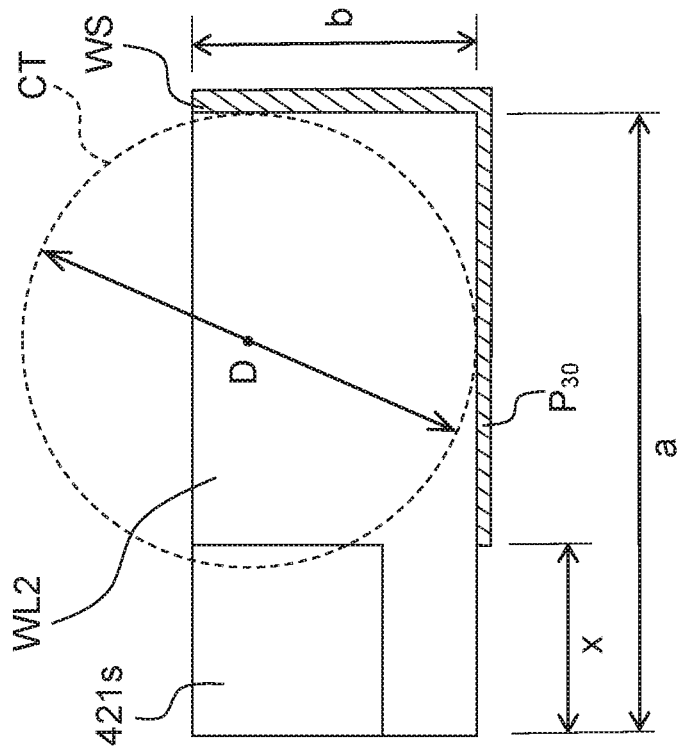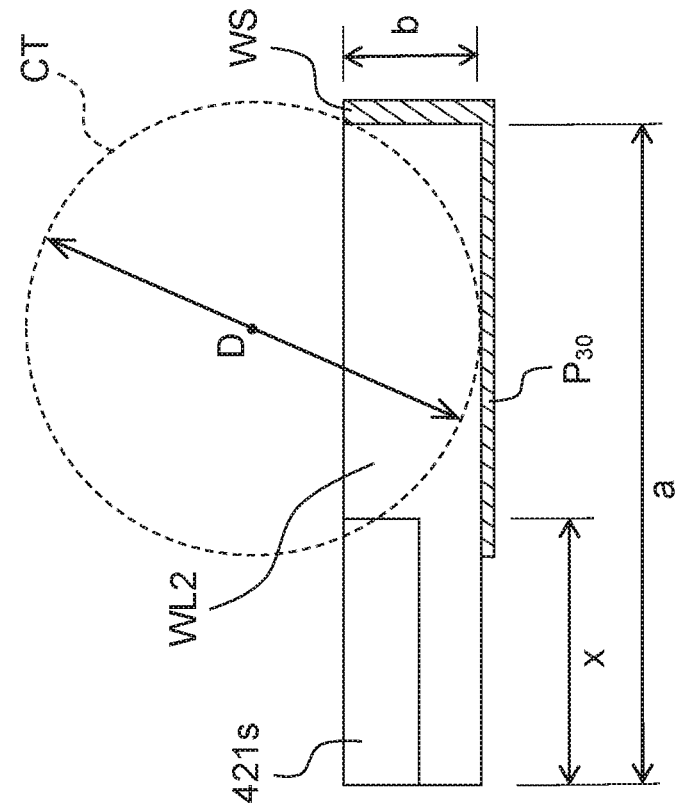

LOAD DETECTOR, LOAD DETECTION KIT, AND LOAD DETECTION SYSTEM

CROSS-REFERENCE TO RELATED APPLICATIONS

This application is a Continuation Application of International Application No. PCT/JP2017/037845 claiming the conventional priority of Japanese patent Application No. 2016-211494 filed on Oct. 28, 2016, and titled "LOAD DETECTION DEVICE, LOAD DETECTION KIT, AND LOAD DETECTION SYSTEM". The disclosures of Japanese patent Applications No. 2016-211494, and International Application No. PCT/JP2017/037845 are incorporated herein by reference in their entirety.

BACKGROUND

The present disclosure relates to a load detector (load detection device) provided with a restriction member, a load detection system including the load detector, and a load detection kit including the load detector and a plurality of pieces of the restriction member.

There is known present-on-bed detection in which a load applied to a bed in hospitals, nursing homes, etc., is detected to determine whether or not a patient or an assisted-living resident is present on the bed. The detection of the load can be performed by disposing or arranging load detectors at various positions, Japanese Patent Application Laid-open No. 2005-300368 discloses, as an example of such a configuration, arranging load detectors under support legs, respectively, which support a bed.

SUMMARY

In some cases, a heavy object, such as a bed, etc., is provided with caster(s), for moving the heavy object, arranged on leg(s) of the heavy object, and the size of the casters are various. Accordingly, for example, in such a case that the size of the caster is small as compared with the size of a placement part (measurement pan) of the load detector, the caster consequently moves on the placement part, which in turn gives rise to such inconvenience that, when the casters are lowered onto the floor surface (floor), any labor is required to adjust the advancing direction of the casters to be oriented toward the floor surface.

An object of the present disclosure is to provide a load detector, load detection kit and a load detection system which are capable of easily placing casters of various sizes onto the placement part, and capable of easily moving the casters of various sizes from the placement part to the floor surface.

According to a first aspect of the present disclosure, there is provided a load detector, including:

a first beam-type load cell which is supported on a first support base in a cantilever manner to have a free end;

a second beam-type load cell which is disposed to face the first beam-type load cell and which is supported on a second support base in a cantilever manner to have a free end;

a placement part on which a rolling body is to be placed, and which includes a first connection part connected to the first beam-type load cell, a second connection part connected to the second beam-type load cell, and a pair of walls, the placement part being disposed between the first beam-type load cell and the second beam-type load cell; and a restriction member which is detachably attached to at least one of the pair of walls of the placement part, and which is configured to restrict a posture of the rolling body on the placement part, wherein the free end of the first beam-type load cell and the free end of the second beam-type load cell face opposite directions to each other in an extending direction of the first beam-type load cell, and the first connection part of the placement part is connected to the first beam-type load cell on a side of the free end of the first beam-type load cell and the second connection part of the placement part is connected to the second beam-type load cell on a side of the free end of the second beam-type load cell.

According to a second aspect of the present disclosure, there is provided a load detection kit including:

a load detector configured to detect a load of a subject including a rolling body; and a plurality of restriction members which are selectively used depending on a width of the rolling body, the load detector including:

a first beam-type load cell which is supported on a first support base in a cantilever manner to have a free end;

a second beam-type load cell which is disposed to face the first beam-type load cell and which is supported on a second support base in a cantilever manner to have a free end; and a placement part on which a rolling body is to be placed, and which includes a first connection part connected to the first beam-type load cell, a second connection part connected to the second beam-type load cell, and a pair of walls, the placement part being disposed between the first beam-type load cell and the second beam-type load cell, wherein the free end of the first beam-type load cell and the free end of the second beam-type load cell face opposite directions to each other in an extending direction of the first beam-type load cell, and the first connection part of the placement part is connected to the first beam-type load cell on a side of the free end of the first beam-type load cell and the second connection part of the placement part is connected to the second beam-type load cell on a side of the free end of the second beam-type load cell;

wherein the plurality of restriction members include at least a first restriction member and a second restriction member; and one of the first restriction member and the second restriction member is detachably attached to at least one of the pair of walls of the placement part so as to restrict a posture of the rolling body on the placement part.

According to a third aspect of the present disclosure, there is provided a load detection system configured to detect a load of a human subject on a bed, the system including:

a plurality of load detectors each of which is the load detector of the first aspect, each of the plurality of load detectors being disposed under each of the legs of the bed; and a controller which is connected to the plurality of load detectors and which is configured to calculate the load of the human subject based on an output of the load detector.

BRIEF DESCRIPTION OF DRAWINGS

FIGS. 4A and 4B are each side view depicting a situation of placing a caster on the placement part, wherein FIG. 4A depicts a situation before the caster is placed on the placement part, and FIG. 4B depicts a situation after the caster has been placed on the placement part.

FIGS. 5A and 5B are each an illustrative view illustrating a preferable size (dimension) of a restriction surface of the restriction member.

FIGS. 6A and 6B are each plan view depicting a situation of placing the caster on the placement part, wherein FIG. 6A depicts a situation before the caster is placed on the placement part, and FIG. 6B depicts a situation after the caster has been placed on the placement part.

EMBODIMENTS

First Embodiment

Figure 1:
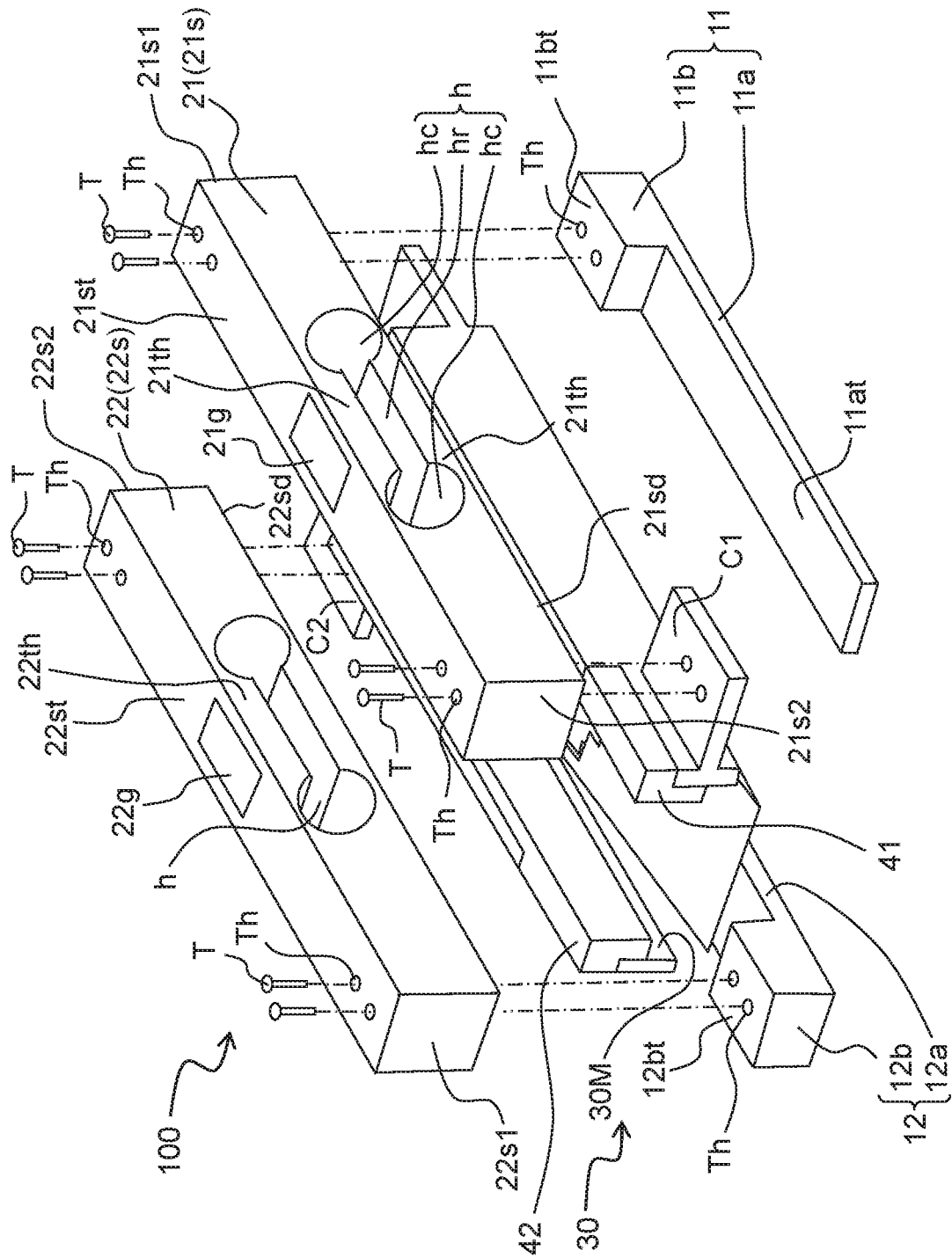
FIG. 1 is an exploded perspective view of a load detector according to a first embodiment of the present disclosure.

An explanation will be given about restriction members (regulation members) 41, 42 of a first embodiment of the present disclosure and a load detector 100 including the restriction members 41, 42, with reference to FIGS. 1 to 15. Note that in the following description, the explanation will be given about an example wherein detection is performed by placing a caster CT, which is attached to a lower end of each of four legs BL (FIG. 4A) of a bed (not depicted in the drawings), on a placement part 30 (to be described later on) so as to detect the load of a subject (human subject) on the bed. The caster CT is rotatably connected to the leg BL, and is capable of rotating about a perpendicular axis parallel to the leg BL to thereby change the advancing direction of the caster CT.

Figure 2:
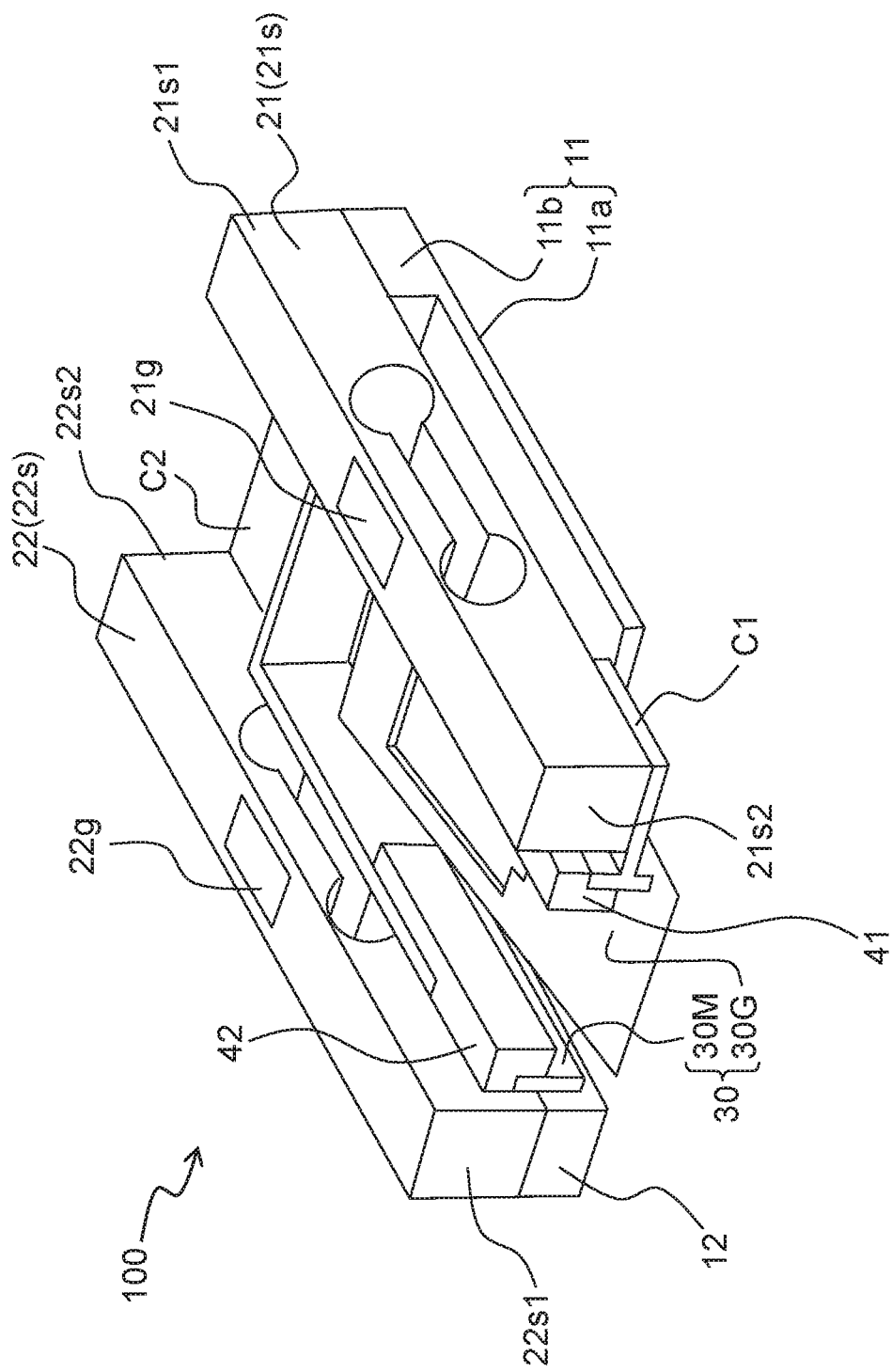
FIG. 2 is a perspective view of the load detector according to the first embodiment of the present disclosure.

As depicted in FIGS. 1 and 2, the load detector 100 mainly includes a first base 11, a second base 12, a first load cell 21 of a beam type (beam shaped) which is connected to the first base 11, a second load cell 22 of a beam type (beam shaped) which is connected to the second base 12, a placement part (mounting part) 30 which is supported by the first and second load cells 21, 22 to be positioned therebetween, and a first restriction member 41 and a second restriction member 42 which are detachably attached to the placement part 30. In the following explanation, a direction in which beams of the beam-type first and second load cells 21, 22 extend is defined as a front-rear direction, and a side on (at) which the first and second restriction members 41 and 42 are provided is defined as the front side. A direction in which the first and second load cells 21 and 22 face (are opposite to) each other is defined as a width direction. Further, a surface on which the load detector 100 is placed or installed is referred to as a floor surface (installation surface).

The first base 11 is a member disposed on the floor surface to support the first load cell 21 in a cantilever manner. The first base 11 includes a flat plate 11a, of which planar shape is a rectangle substantially same to the planer shape of the first load cell 21, and a support base part (a support base) 1b which protrudes or extends upward from an end of the flat plate 11a. Accordingly, a top surface 11bt of the support base part 11b is positioned above a top surface 11 at of the flat plate 11a.

The top surface 11bt of the support base part 11b is formed with two screw holes Th. The first load cell 21 is fixed to the support base part 11b via screws T and the screw holes Th.

The second base 12, which has the same shape as the first base 11, includes a flat plate 12a and a support base part (a support base) 12b. The second base 12 is arranged to face the first base 11 (to be parallel to the first base 11 in this embodiment), with a predetermined distance intervening therebetween; however, the support base part 11b of the first base 11 is arranged to face a side opposite to the side which the support base part 12b is arranged to face. Namely, a location at which the support base part 11b is connected to the flat plate 11a of the first base 11 and a location at which the support base part 12b is connected to the flat plate 12a of the second base 12 are on mutually opposite sides. The second load cell 22 is fixed to the support base part 12b via screws T and screw holes Th formed in the top surface 12bt of the support base part 12b.

The first load cell 21, which is a beam-type load cell, includes a flexure element (strain body) 21s in a rectangular column shape which has a through hole h, and a strain gauge 21g attached to the flexure element 21s. The first load cell 21 detects the strain or distortion generated in the flexure element 21s as the change in a resistance value of the strain gauge 21g, thereby detecting the load applied to the first load cell 21.

The flexure element 21s is an elongated (long) square pillar made of metal such as aluminum, iron, etc. The through hole h, which passes through the flexure element 21s in the width direction, is formed in a central portion in the longitudinal direction of the flexure element 21s. The through hole h includes two circular holes hc and a rectangular hole hr. Each of the circular holes he has a circular cross-sectional shape, and the rectangular hole hr, which has a substantially rectangular cross-sectional shape, connects the two circular holes hc to each other in the longitudinal direction. Thin parts 21th which are thinner in the up-down direction due to existence of the through hole h are defined respectively in portions or parts, of the flexure element 21s, located on the upper and lower sides of the through hole h.

A rear end of the flexure element 21s is fixed to the support base part 11b of the first base 11 via screw holes Th which are disposed in the vicinity of the rear end and screws T. This allows the flexure element 21s to be supported by the first base 11 (support base part 11b) in a cantilever manner, with the rear end of the flexure element 21s as a fixed end 21s1 and a front end of the flexure element 21s as a free end 21s2.

The placement part 30 is fixed to a lower surface 21sd, of the flexure element 21s, at a part or portion thereof in the vicinity of the free end 21s2 of the flexure element 21s via screws T and screw holes Th. Namely, the flexure element 21s (first load cell 21) supports the placement part 30 in the vicinity of the free end 21s2 so that the placement part 30 is movable in the up-down direction.

The strain gauge 21g is provided as strain gauges 21g which are attached to the flexure element 21s such that one of the strain gauges 21g is attached to an upper surface 21st of the flexure element 21s and the other of the strain gauges 21g is attached to the lower surface 21sd of the flexure element 21s, at a substantially central portion in the longitudinal direction of the flexure element 21s. Further, the strain gauges 21g are connected to an external controller via unillustrated lead wires.

The second load cell 22, which has the same structure as the first load cell 21, includes a flexure element (strain body) 22s in a rectangular column-shape and two strain gauges 22g. The flexure element 22s includes a through hole h passing through a central portion of the flexure element 22s in the width direction. The strain gauges 22g are attached respectively to thin parts 22th of the flexure element 22s. The second load cell 22 is arranged to face the first load cell 21 (to be parallel to the first load cell 21 in this embodiment) with a predetermined distance intervening therebetween.

A front end of the flexure element 22s is fixed to the support base part 12b of the second base 12 via screw holes Th provided in the vicinity of the front end and screws T. This allows the flexure element 22s to be supported by the second base 12 (support base part 12b) in a cantilever manner, with the front end of the flexure element 22s as a fixed end 22s1 and a rear end of the flexure element 22s as a free end 22s2.

Two screw holes Th passing through the flexure element 22s in the up-down direction are formed also in the vicinity of the free end 22s2 of the flexure element 22s. The placement part 30 is fixed to a lower surface 22sd, of the flexure element 22s, at a part or portion thereof in the vicinity of the free end 22s2 via screws T and the screw holes Th. Namely, the flexure element 22s (second load cell 22) supports the placement part 30 in the vicinity of the free end 22s2 so that the placement part 30 is movable in the up-down direction. In view of the arrangement relationship between the flexure element 21s and the flexure element 22s, the fixed end 22s1 of the flexure element 22s is in the same positions, in the longitudinal direction, as the free end 21s2 of the flexure element 21s of the load cell 21, and the free end 22s2 of the flexure element 22s is in the same position, in the longitudinal direction, as the fixed end 21s1 of the flexure element 21s of the load cell 21. Namely, although the flexure element 21s and the flexure element 22s extend in the same direction while facing each other, an orientation of the free end relative to the fixed end is mutually opposite (reverse) between the flexure element 21s and the flexure element 22s. Further, the support base part 11b supporting the flexure element 21s is in substantially the same position as the free end 22s2 of the flexure element 22s in the front-rear direction, and the support base part 12b supporting the flexure element 22s is in substantially the same position as the free end 21s2 of the flexure element 21s in the front-rear direction.

Figure 3:
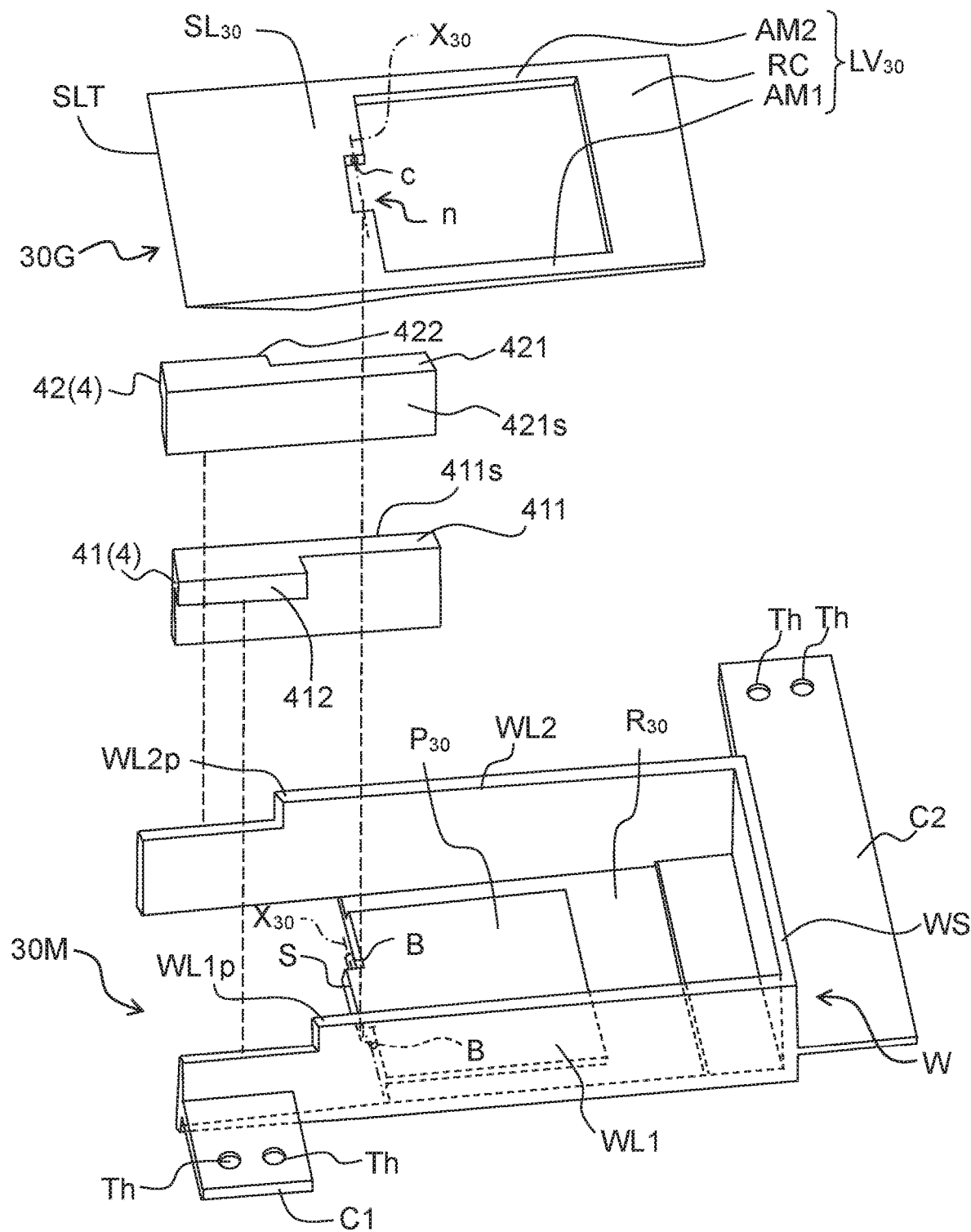
FIG. 3 is an exploded perspective view of a placement part included in the load detector according to the first embodiment of the present disclosure.

The placement part 30 is a measurement pan on which a subject such as the caster CT, etc., is placed, in a case that the load is to be detected by using the load detector 100. As depicted in FIG. 3, the placement part 30 includes a main body 30M and a guide 30G which is attached to the main body 30M so that the guide 30G is swingable (swingably movable) or pivotable (pivotally movable) with respect to the main body 30M.

The main body 30M includes a rectangular plate (plate portion) $P_{30}$ on which the subject is placed, a wall W surrounding the plate $P_{30}$ in three directions therearound, and a first connection part C1 and a second connection part C2 which are provided on the wall W. A side, on which a subject (detection target) as described below is placed relative to the plate $P_{30}$, is defined as the upper side of the main body 30M and the plate $P_{30}$ (above the main body 30M and the plate $P_{30}$); an opposite side opposite to the upper side is defined as the lower side of the main body 30M and the plate $P_{30}$ (below the main body 30M and the plate $P_{30}$).

A recess $R_{30}$, which has substantially a C-shape (substantially a U-shape) in plan view, is provided in the upper surface of the plate $P_{30}$. The recess $R_{30}$ is formed so that an opening portion of the C-shape (U-shape) is positioned, in the plan view, on one side in the long-side direction of the plate $P_{30}$ (on a side wherein the wall W is not present).

One short side, included in a pair of short sides of the plate $P_{30}$, in which the wall W is not present is provided with an axis support part S which has a rectangular parallelepiped shape and is disposed at a central portion of the short side. The axis support part S is provided with bosses B protruding toward both sides in the short-side direction of the plate $P_{30}$.

The wall W, which is arranged such that the wall W is perpendicular (orthogonal) to the plate $P_{30}$, includes a first long wall WL1 extending along one of the long sides of the plate $P_{30}$, a second long wall WL2 extending along the other of the long sides of the plate $P_{30}$, and a short wall WS extending along one of the short sides of the plate $P_{30}$ and connecting rear ends of the first long wall WL1 and the second long wall WL2.

Front ends of the first and second long walls WL1 and WL2 protrude forwardly beyond the plate $P_{30}$. In the following description, a protruding portion of the first long wall WL1 is referred to as a first protrusion WL1p, and a protruding portion of the second long wall WL2 is referred to as a second protrusion WL2p. Upper surfaces of the first and second protrusions WL1p and WL2p are sunken or recessed downwardly in the vicinity of the front ends thereof so as to form sunken areas. The sunken areas are formed with screw holes (not depicted in the drawings) for attaching the first and second restriction members 41 and 42 to the first and second protrusions WL1p and WL2p, respectively.

A first connection part C1, which has a plate-like shape and is parallel to the plate $P_{30}$, is provided on the outer surface, of the first protrusion WL1p, facing a side opposite to the side on which the plate $P_{30}$ is positioned. The first connection part C1 is fixed to the lower surface 21sd of the flexure element 21s of the first load cell 21 in the vicinity of the free end 21s2 of the flexure element 21s via screws T and screw holes Th (FIGS. 1 and 2).

A second connection part C2 having a plate-like shape and being parallel to the plate $P_{30}$ is provided on the outer surface, of the short wall WS, facing a side opposite to the side on which the plate $P_{30}$ is positioned. The second connection part C2 has a rectangular shape of which longitudinal direction is the extending direction of the short wall WS. An end in the longitudinal direction of the second connection part C2 is a protruding portion protruding beyond the second long wall WL2. The second connection part C2 is fixed to the lower surface $22sd$ of the flexure element $22s$ of the second load cell 22 in the vicinity of the free end $22s2$ of the flexure element $22s$ via screws T and screw holes Th provided on the protruding portion (FIGS. 1 and 2).

Figure 7:
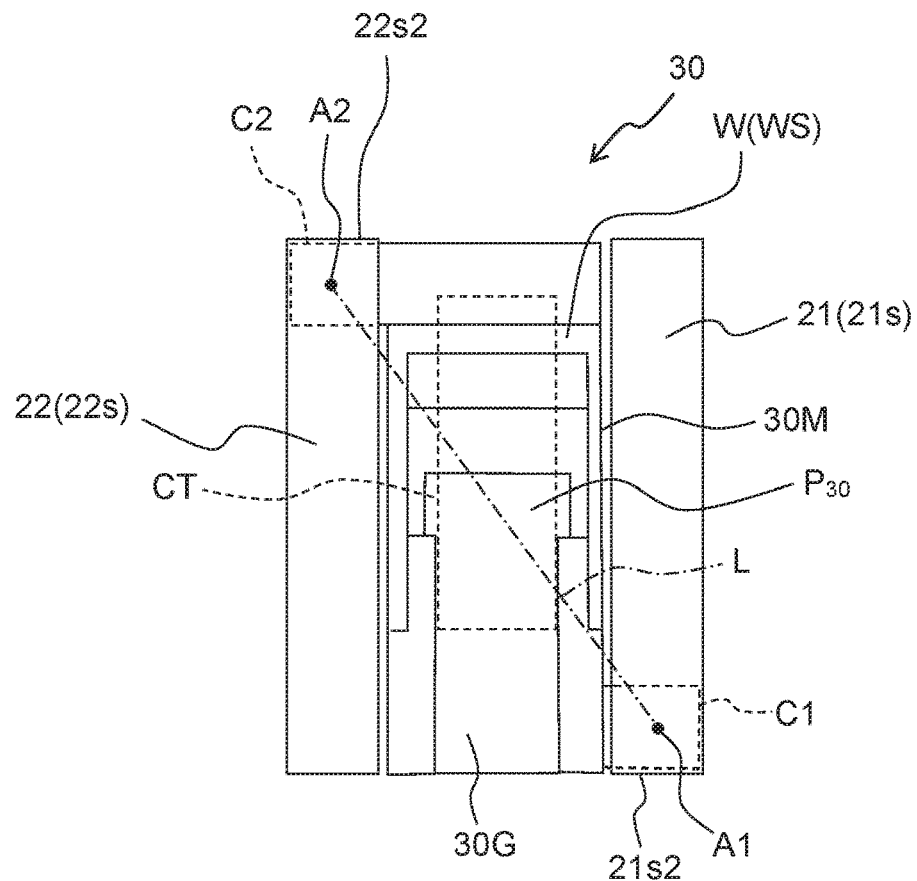
FIG. 7 is an illustrative view illustrating the relationship between an attachment position at which the placement part is attached to load cells and a suitable placing position of subject on the placement part.

As depicted in FIG. 7, the short wall WS is arranged such that the center of gravity of the caster CT (in FIG. 7, the caster CT is depicted as a cross-sectional shape thereof by a horizontal plane including the axis of rotation thereof), which is brought into contact with the short wall WS and is placed on the plate $P_{30}$, is positioned on a line L or in the vicinity thereof, the line L connecting a connection center point A1 of the connection of the first connection part C1 to the first load cell 21 and a connection center point A2 of the connection of the second connection part C2 to the second load cell 22. The reason for such an arrangement will be described later on.

The guide 30G, which is a member having a plate-like shape, includes a slope $SL_{30}$ and a lever $LV_{30}$ connected integrally with the slope $SL_{30}$.

The slope $SL_{30}$ has substantially a rectangular shape in plan view. The upper surface of the slope $SL_{30}$ defines an inclined surface (slope) for moving a rolling body such as a caster CT, etc., from the floor surface onto the placement part 30. In the slope $SL_{30}$, a notch n which has substantially a rectangular shape in plan view is defined at a central portion of a long side (one end), of the slope $SL_{30}$, to which the lever $LV_{30}$ is connected. A pair of surfaces facing each other and defining short sides of the notch n respectively are provided with recessed holes c. The slope $SL_{30}$ is thicker than the lever $LV_{30}$ (see FIGS. 3 and 4). The slope $SL_{30}$ is tapered in side view toward a forward end (a front end, the other end) SLT such that the forward end SLT is thinned.

The lever $LV_{30}$ includes a first arm AM1 and a second arm AM2 which are connected respectively to both ends of the long side of the rectangular slope $SL_{30}$, and a rectangular part (contact part) RC which is connected to the first arm AM1 and the second arm AM2, on a side opposite to the slope $SL_{30}$. The lever $LV_{30}$ has substantially a C-shape (U-shape) in plan view.

The bosses B of the axis support part S of the plate $P_{30}$ are fitted respectively into the recessed holes c of the notch n of the slope $SL_{30}$ to thereby allow the guide 30G to be connected to the main body 30M so that the guide 30G is swingable (pivotable), with respect to the main body 30M, about a swing axis $X_{30}$ defined by connecting the bosses B and the recessed holes c. The guide 30G is configured so that the front side of the recessed holes c (the forward end SLT side of the slope $SL_{30}$) is heavier than the rear side of the recessed holes c (the lever $LV_{30}$ side), by making the thickness and structure of the slope $SL_{30}$ to be different from those of the lever $LV_{30}$, in the length (extending) direction of the guide 30G, as described above. Due to this configuration, as long as no load is applied to the lever $LV_{30}$, the guide 30G swings or pivots, with the swing axis $X_{30}$ as the center of rotation, in a direction in which the forward end SLT moves downward (is lowered), thereby allowing the forward end SLT to make contact with the floor surface. Note that, instead of the configuration in which the weight on the side of the forward end SLT of the slope $SL_{30}$ is allowed to be heavier than that on the side of the lever $LV_{30}$ of the slope $SL_{30}$, it is allowable to provide a mechanism which urges (biases) the forward end SLT toward the floor surface, by means of a spring, a magnet, etc.

The shape in plan view of the recess $R_{30}$ provided on the plate $P_{30}$ of the main body 30M is substantially the same as the shape in plan view of the lever $LV_{30}$ of the guide 30G. Accordingly, in a case that the guide 30G pivotally moves relative to the main body 30M to thereby cause the lever $LV_{30}$ of the guide 30G to make contact with the plate $P_{30}$ of the main body 30M, the lever $LV_{30}$ is arranged in the recess $R_{30}$ (FIG. 4B). In this situation, it is also allowable to make the upper surface of the lever $LV_{30}$ be flush with the upper surface of the plate $P_{30}$.

Each of the first and second restriction members 41 and 42 (a pair of restriction parts) is a resin member which restricts (regulates) the posture of a subject, such as the caster CT, etc., placed on the placement part 30 (namely, which restricts the rotation of the subject about the perpendicular axis or restricts change in the advancing direction of the subject). The first restriction member 41 is provided with main body part 411 having a shape of elongated rectangular parallelepiped, and connecting part 412 which is integral with the main body part 411. The second restriction member 42 is provided with main body part 421 having a shape of elongated rectangular parallelepiped, and connecting part 422 which is integral with the main body part 421.

Surfaces of the main body parts 411 and 421 which extend along the longitudinal direction thereof are restriction surfaces $411s$ and $421s$ which make contact with the caster CT so as to restrict the posture of the caster CT. Each of the restriction surfaces $411s$ and $421s$ has such a size that the regulating surfaces $411s$ and $421s$ are arranged in the vicinity of side surfaces of the caster CT in a case that the caster CT is placed on the plate $P_{30}$ of the placement part 30 to which the first restriction members 41 and 42 are attached.

More specific explanation will be provided with reference to FIGS. 5A and 5B. It is desired that the size of the restriction surface $421s$ in a direction coincident with the front-rear direction (hereinafter simply referred to as the "front-rear direction") in a state that the restriction surface $421s$ is attached to the placement part 30 satisfies the following condition, provided that the size in the front-rear direction of the restriction surface $421s$ is "x", size in the front-rear direction of the second long wall WL2 of the placement part 30 is "a", the height of the short wall WS is "b", and the diameter of the caster CT is "D". Note that a size "x" in the front-rear direction of the restriction surface $411s$ is represented also by the same expression, with the size in the front-rear direction of the first long wall WL1 of the placement part 30 as the "a".

(1) In a case that b<D/2 (FIG. 5A)

$$x > a - 2\sqrt{Db - b^2}$$

(2) In a case that b≥D/2 (FIG. 5B)

$$x > a - D$$

The above-described size is a size in the front-rear direction of each of the restriction surfaces $411s$ and $421s$ which is minimally required in order that at least a portion or part of each of the restriction surfaces $411s$ and $421s$ faces (is opposite to) the side surface of the caster CT placed on the plate $P_{30}$, in a case that the first and second restriction surfaces 41 and 42 which are capable of arbitrarily setting the sizes in the up-down direction of the restriction surfaces $411s$ and $412s$ are attached such that the front ends of the restriction surfaces $411s$ and $421s$ are coincident (match) with the front ends of the first and second long walls WL1 and WL2, respectively. Even in such a case that only small parts or portions in the vicinity of the rear ends of the restriction surfaces 411s and 421s face the side surfaces of the caster CT placed on the plate $P_{30}$, it is possible to satisfactorily restrict the posture of the caster CT owing to the contact between the restriction surfaces 411s and 421s and the side surfaces of the caster CT, when gaps between the restriction surfaces 411s and 421s and the caster CT are small. Note that although there is no particular limitation on the upper limit of the size x, it is preferred that the size x is made to be not more than the size "a" of the first and second long walls WL1 and WL2.

The connecting parts 412 and 422 are provided like flanges, on surfaces, of the main body parts 411 and 412, opposite to the restriction surfaces 411s and 421s. The connecting parts 412 and 422 are provided with screw holes (not depicted in the drawings), respectively.

The first restriction member 41 is detachably attached to the placement part 30 by a screwing using the screw hole provided on the first protrusion WL1p of the main body 30M of the placement part 30 and the screw hole in the connecting part 412. With this, the first restriction member 41 is attached to the placement part 30 in a state that the upper surface and the outer surface of the connecting part 412 are flush with the upper surface and the outer surface of the first protrusion WL1p, respectively (see FIGS. 1 and 2). The second restriction member 42 is also detachably attached to the second protrusion WL2p of the placement part 30 in a similar manner as regarding the first restriction member 41.

Further, the load detector 100 of the present embodiment is also provided with restriction members which have a substantially same shape as that of the first and second restriction members 41 and 42, and which are different only in view of the thickness of the main bodies 411 and 421 (the size orthogonal to the restriction surfaces 411s and 421s), as restriction members for replacement. The first and second restriction members 41 and 42 and these restriction members for replacement construct a set 4 of restriction members (restriction member set 4).

Next, an explanation will be given about a method of using the load detector 100, with reference to FIGS. 4A and 4B, and FIGS. 6A and 6B.

In a case that the load detection of a (human) subject on a bed is performed by using the load detector 100 of the present embodiment, firstly, optimal restriction members are selected from the restriction member set 4, depending on the width (size in the direction of a horizontal rotary shaft or axis) of the four casters CT which are provided respectively on the lower ends of four bed legs BL of the bed. The term "optimal restriction members" indicate restriction members having such a size that the width of a gap defined between the mutually facing restriction surfaces in a case that the restriction members are attached to the placement part 30 is slightly greater than the width of the caster CT. In the present specification and in the present disclosure, in a case that the width of the gap defined between the restriction members is such a width which is slightly greater than the width of the caster CT and is a width of such an extent that makes it possible to maintain the advancing direction of the caster CT placed on the placement part at a direction convenient for moving the caster CT onto the floor surface, the width is referred to as a "width in accordance with the width of the caster".

In the following, an explanation is given about a case, as an example, that the optimal restriction members are the first and second restriction members 41 and 42 depicted in FIGS. 1 to 3.

After the first and second regulating members 41 and 42 are attached to the placement part 30 of the load detector 100, the four casters CT provided on the lower ends of the four legs BL, respectively, of the bed are placed on the placement parts 30 of the load detectors 100, respectively. Specifically, the load detectors 100 are arranged, respectively, in the vicinity of the four casters CT, and the four casters are placed, substantially concurrently, on the plates $P_{30}$ via the slopes $SL_{30}$, respectively.

In a state where the caster CT is not placed on the plate $P_{30}$ (FIGS. 4A and 6A), the forward end SLT of the slope $SL_{30}$ is in a first position at which the forward end SLT is brought into contact with a floor surface F due to the self-weight of the slope $SL_{30}$. In that situation, since there is not any difference in the height between the floor surface F and the slope $SL_{30}$, the caster CT is capable of easily moving obliquely upward along the upper surface (inclined surface) of the slope $SL_{30}$. Then, the caster CT is capable of reaching the forward end of the plate $P_{30}$ of the main body 30M, namely, a position on the swing axis $X_{30}$. So far, there is no change in the posture of the guide 30G.

Further, in a case that the caster CT moves on the slope $SL_{30}$, the regulating surfaces 411s and 421s of the first and second regulating members 41 and 42 extend in the front-rear direction in the proximity of the both surfaces in the width direction of the caster CT. Accordingly, the caster CT climbs the slope $SL_{30}$ linearly in the front-rear direction without generating any change in the posture of the caster CT, namely any rotation about the perpendicular axis (change in the advancing direction).

Figure 6A:
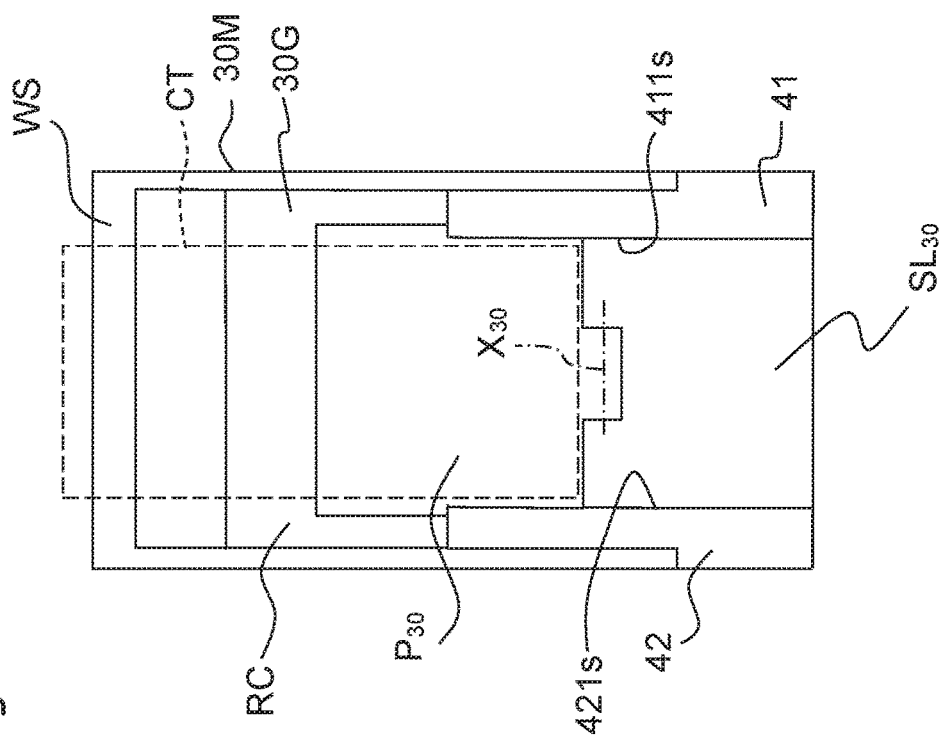
Figure 6B:
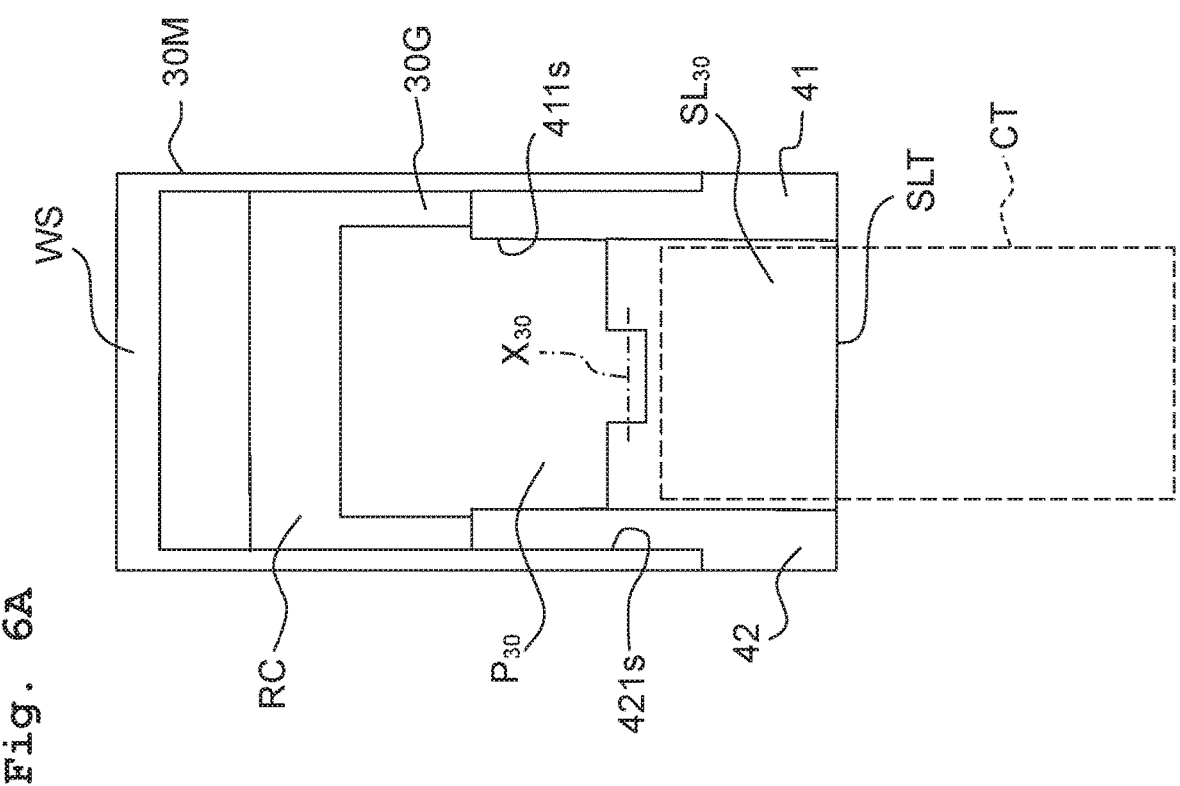

Subsequently, in a case that the caster CT which has reached the forward end of the plate $P_{30}$ (i.e., the position on the swing axis $X_{30}$) passes beyond the swing axis $X_{30}$ and moves toward the short wall WS, the caster CT runs up onto the rectangular part RC of the lever $LV_{30}$ of the guide 30G, and pushes the rectangular part RC downward. This causes the guide 30G to swing about the swing axis $X_{30}$ as the center, which in turn causes the lever $LV_{30}$ of the guide 30G to be accommodated or to fit in the recess $R_{30}$ of the plate $P_{30}$ of the main body 30M (FIGS. 4B and 6B). The caster CT stops at the timing at which the caster CT comes into contact with the short wall WS, thereby ending the placement of the caster CT.

In the above-described state, the forward end SLT of the slope $SL_{30}$ has swung to a second position at which the forward end SLT is separated away from the floor surface. In the second position, the entirety of the slope $SL_{30}$ including the forward end SLT is separated away from the floor surface. Further, a flat surface is defined by the upper surface of the plate $P_{30}$ and the upper surface of the lever $LV_{30}$; since the caster CT is positioned on the flat surface, there is no such a fear of, for example, a measurement error, which might otherwise be caused by movement of the caster CT due to any height difference between the upper surface of the plate $P_{30}$ and the upper surface of the rectangular part RC.

Further, even in such a state that the caster CT makes contact with the short wall WS and is placed on the plate $P_{30}$, a portion or part, of the caster CT, which is arranged in the vicinity of the slope $SL_{30}$ is located in the gap defined between the restriction surfaces 411s and 421s of the first and second restriction members 41 and 42, as depicted in FIGS. 4B and 6B. Accordingly, also in a state that the caster CT is placed on the plate $P_{30}$ (namely, in a state of the load detection), the posture of the caster CT is restricted (namely, the rotation of the caster CT about the perpendicular axis is restricted); in a case that the caster CT is lowered onto the floor surface F after the load has been detected, the caster CT can be easily moved forwardly.

Note that in order to prevent rotational movement of the caster CT about the horizontal axis, the caster CT may be locked after being placed on the placement part 30.

The load of a human subject on the bed is transmitted to the flexure element 21s of the first load cell 21 and the flexure element 22s of the second load cell 22 which support the placement part 30, via leg BL of the bed, the caster CT, and the placement part 30. The load transmitted to the flexure element 21s and the flexure element 22s generates the strain in the flexure element 21s and the flexure element 22s, and the strain gauges 21g, 22g each detect the strain as the change in a resistance value. The detected change in the resistance value is outputted, via a lead wire (not depicted in the drawing), to the controller (not depicted in the drawing) which is provided outside the load detector 100, or provided in the first base 11 or the second base 12. The controller performs an arithmetic processing to thereby make it possible to determine the load of the human subject.

Here, an explanation will be given about the reason for supporting the placement part 30 in the load detector 100 of the first embodiment, at two points by using the first load cell 21 and the second load cell 22.

In the load detector 100 of the present embodiment, as depicted in FIG. 7, the main body 30M of the placement part 30 is supported in the vicinity of the free end 21s2 of the flexure element 21s of the first load cell 21 via the first connection part C1, and is supported in the vicinity of the free end 22s2 of the flexure element 22s of the second load cell 22 via the second connection part C2, such that the main body 30M is movable in the up-down direction; and the main body 30M of the placement part 30 is least likely to bend on the line L connecting the connection center point A1 and the connection center point A2 in the shortest distance. Thus, by arranging the caster CT of the bed on the line L, it is possible to detect the load of the human subject on the bed in a state that the effect (influence) due to the bending of the placement part 30 is suppressed.

As described above, in the load detector 100 according to the present embodiment, the short wall WS of the main body 30M of the placement part 30 is arranged such that the center of gravity of the caster CT brought into contact with the short wall WS is positioned on the line L or in the vicinity thereof. Thus, it is possible to detect the load of the human subject stably and precisely by stably arranging the caster CT on the line L or in the vicinity thereof.

Figure 8:
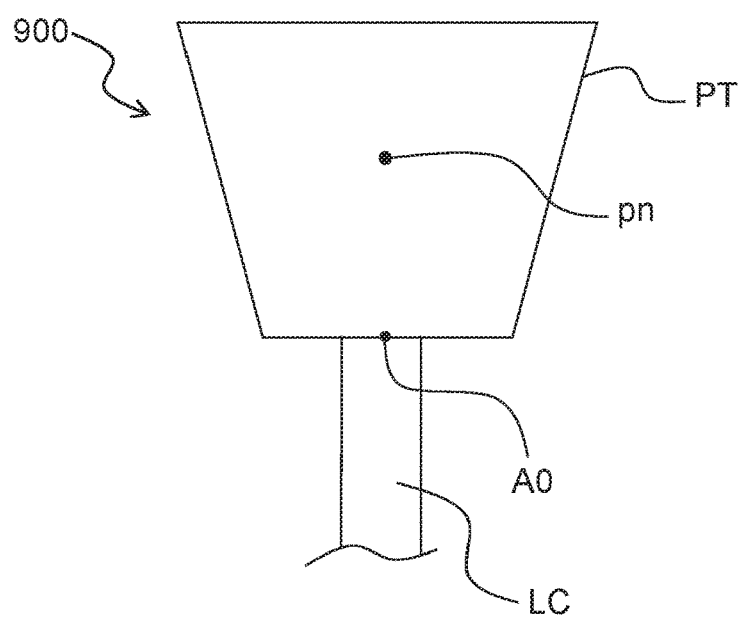
FIG. 8 is an illustrative view illustrating a placing position at which a subject is placed on a placement plate in a load detector using a single beam-type load cell.

The load detector 100 of the present disclosure can perform the load detection more stably and accurately than a load detector in which a placement plate is attached to an end of one piece of a beam-type load cell (hereinafter referred to as a single-load-cell-type load detector). The reason thereof will be explained while referring to a single-load-cell-type load detector 900 depicted in FIG. 8. In the single-load-cell-type load detector 900 wherein a placement plate PT is attached to an end of a beam-type load cell LC as depicted in FIG. 8, the position deviation error (eccentric error) is relatively small in a case that a placement position pn of a detection target is in the vicinity of a connection position A0 between the beam-type load cell LC and the placement plate PT, whereas the position deviation error becomes greater as the placement position pn is separated further away from the connection position A0. The reason thereof is as follows: namely, as the placement position pn is separated further away from the connection position A0 in the longitudinal direction of the beam-type load cell LC with a separation distance, the bending moment of which degree depends on the separation distance and which is about an axis extending in the width direction of the beam-type load cell LC acts on a flexure element of the beam-type load cell LC, to thereby cause the strain in the flexure element. This strain causes the position deviation error in the strain gauge of the beam-type load cell LC. Further, as the placement position pn is separated further away from the connection position A0 in the width direction of the beam-type load cell LC with a separation distance, the torsional or twisting moment of which degree depends on the separation distance and which is around an axis extending in the longitudinal direction of the beam-type load cell LC acts on the flexure element of the beam-type load cell LC, to thereby cause the strain in the flexure element. This strain causes the position deviation error in the strain gauge of the beam-type load cell LC.

Figure 9:
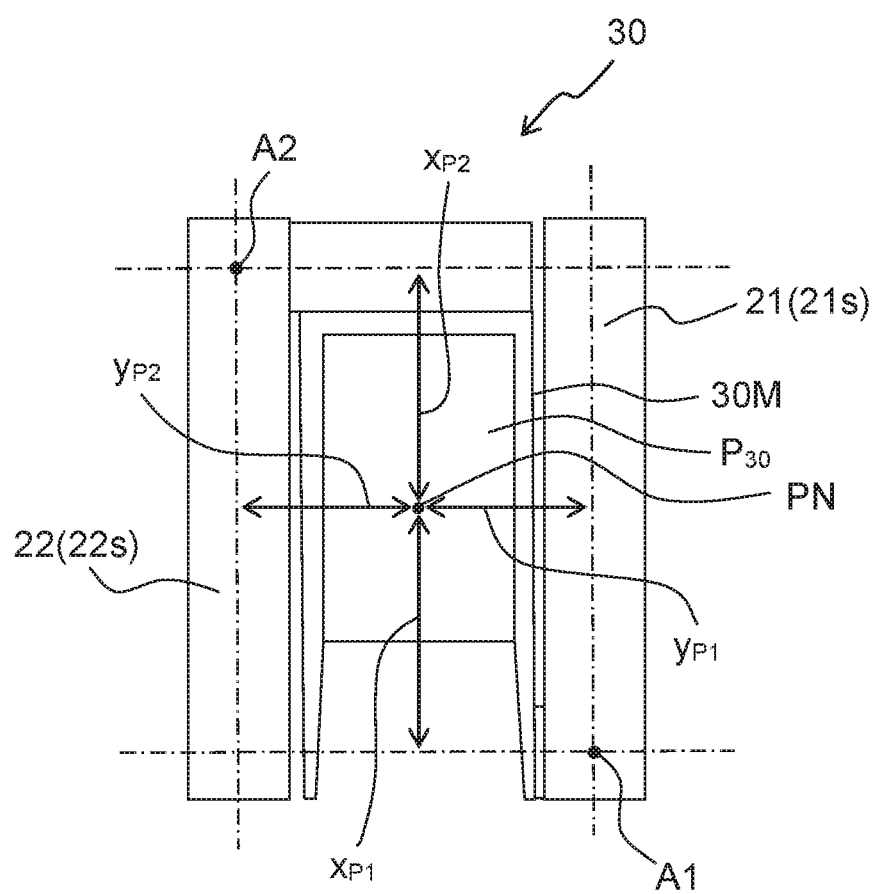
FIG. 9 is an illustrative view illustrating distances, in a front-rear direction and a width direction, between a position of the subject placed on the placement part and the attachment position at which the placement part is attached to the load cells.

In contrast, in the load detector 100 of the present embodiment, provided that a distance in the longitudinal direction between the connection center point A1 and a placing position PN of the detection target placed on the plate $P_{30}$ of the main body 30M of the placement part 30 is defined as a distance $x_{P1}$, and that a distance, in the longitudinal direction between the connection center point A2 and the placing position PN is defined as a distance $x_{P2}$ as depicted in FIG. 9, then the total of the distances $x_{P1}$, $x_{P2}$ is constant over substantially the entire area of the plate $P_{30}$ of the main body 30M. Thus, even in such a case that the placement position PN is moved or displaced in the front-rear direction in the load detector 100 of the present embodiment, the total of the position deviation error caused in the first load cell 21 by the bending moment and the position deviation error caused in the second load cell 22 by the bending moment is approximately constant (a value having a predetermined ratio to the weight of the detection target) at all times. Therefore, the load of the detection target can be detected stably in a state that the effect (influence) of the position deviation error caused by the bending moment is substantially removed, for example, by allowing the controller (not depicted in the drawings) to perform, for example, a processing of summing up detection values of the first load cell 21 and the second load cell 22 and subtracting a value having a constant ratio to the detection values from the summed detection values, as the position deviation error.

Further, provided that a distance in the width direction between the connection center point A1 and the placing position PN of the detection target placed on the plate $P_{30}$ of the main body 30M is defined as a distance $y_{P1}$, and that a distance in the width direction between the connection center point A2 and the placing position PN is defined as a distance $y_{P2}$ as depicted in FIG. 9, then the total of the distances $y_{P1}$, $y_{P2}$ is constant over substantially the entire area of the plate $P_{30}$ of the main body 30M. Thus, even in such a case that the placing position PN is displaced in the width direction in the load detector 100 of the present embodiment, the total of the position deviation error caused in the first load cell 21 by the torsional moment and the position deviation error caused in the second load cell 22 by the torsional moment is approximately constant (a value having a predetermined ratio to the weight of the detection target) at all times. Therefore, the load of the detection target can be detected stably in a state that the effect (influence) of the position deviation error caused by the torsional moment is substantially removed by performing a processing similar to the processing which is performed regarding the case of the bending moment.

Effects of the load detector 100 of the present embodiment are summarized as follows.

The placement part 30 possessed by the load detector 100 of the present embodiment is provided with the first and second restriction members 41 and 42 which are attached to the placement part 30 and which restricts the posture of the caster CT as the subject (namely, restricts the rotation about the perpendicular axis of the caster CT, or restricts the change in the advancing direction of the caster CT). Accordingly, it is possible to restrict or regulate, by the first and second restriction members 41 and 42, the advancing direction of the caster CT substantially only to the front-rear direction, and to thereby easily cause the caster CT to run up onto the placement part 30 and to separate away from the placement part 30.

The load detector 100 of the present embodiment includes the restriction member set 4 including the plurality of restriction members having a variety of kinds of thicknesses in the direction orthogonal to the restriction surface; optimal restriction members are selected from the restriction member set 4 and are detachably attached to the placement part 30. Accordingly, merely by exchanging the restriction members depending on the width of the caster CT, it is possible to restrict the posture of each of the casters CT having the various widths, thereby making it possible to easily cause each of the casters CT having various sizes to run up onto and separate from the placement part 30.

The placement part 30 possessed by the load detector 100 of the present embodiment includes the main body 30M and the guide 30G which is swingable relative to the main body 30M. In a case that the rolling body such as the caster CT, etc., as the subject is introduced on the main body 30M, it is possible to use the slope $SL_{30}$ having the forward end SLT brought into contact with the floor surface F. The subject can thus be placed on the main body 30M easily.

In the placement part 30 possessed by the load detector 100 of the present embodiment, in a case that the rolling body such as the caster CT, etc., as the subject is caused to move on the main body 30M, the lever $LV_{30}$ of the guide 30G is pushed toward the main body 30M to thereby cause the guide 30G to rotate (swing), which in turn separates the forward end SLT of the slope $SL_{30}$ from the floor surface F. The state wherein the slope $SL_{30}$ is separated from the floor surface F is maintained as long as the rolling body is present on the main body 30M. Thus, in the load detection which is performed by placing the detection target on the main body 30M, there arises no measurement error which might otherwise be caused due to any contact between the guide 30G and the floor surface F.

In the placement part 30 provided on the load detector 100 of the present embodiment, a major part or portion of the load from the rolling body such as the caster CT, etc., is applied to the plate $P_{30}$, and only a part of the load from the rolling body such as the caster CT, etc., is applied to the guide 30G via the rectangular part RC of the lever $LV_{30}$. Owing to this configuration, it is possible to avoid any load from being applied to the swing axis $X_{30}$ over time, thereby preventing components or parts, such as the bosses B, the recessed holes c, etc., from being damaged. Note that it is desired to set the depth of the recess $R_{30}$ (the height of the upper surface of the plate $P_{30}$ relative to the bottom surface of the recess $R_{30}$) to be greater than the thickness of the lever $LV_{30}$. In such a case, a gap (clearance or backlash) is defined between the lower surface of the lever $LV_{30}$ and the bottom surface of the recess $R_{30}$, and thus the load from the rolling body such as the caster CT, etc., is applied only to the plate $P_{30}$, thereby making it possible to further reduce the load on the swing axis $X_{30}$.

In the load detector 100 of the present embodiment, each of the total value of the position deviation errors which are caused in the first and second load cells 21, 22 by the bending moment and the total value of the position deviation errors which are caused in the first and second load cells 21, 22 by the torsional moment is substantially constant at all times (the value having the predetermined ratio to the weight of the detection target). Therefore, the effect (influence) of each of the position deviation errors is substantially removed by summing up detection values of the first load cell 21 and the second load cell 22 and subtracting the predetermined position deviation errors from the total of the detection values, thereby making it possible to perform the load detection stably and precisely.

<Modifications>

In the load detector 100 of the first embodiment, it is allowable to use a restriction member having the following shape, instead of using the first and second restriction members 41 and 42. Note that in the following, although an explanation will be given about a modification of the second restriction member 42 and the second protrusion WL2p to which the second restriction member 42 is detachably attached, it is needless to say that a first restriction member 41 and a first protrusion WL1p having similar configurations, respectively, to those in the modification of the second restriction member 42 and the second protrusion WL2p may be adopted.

Figure 10C:
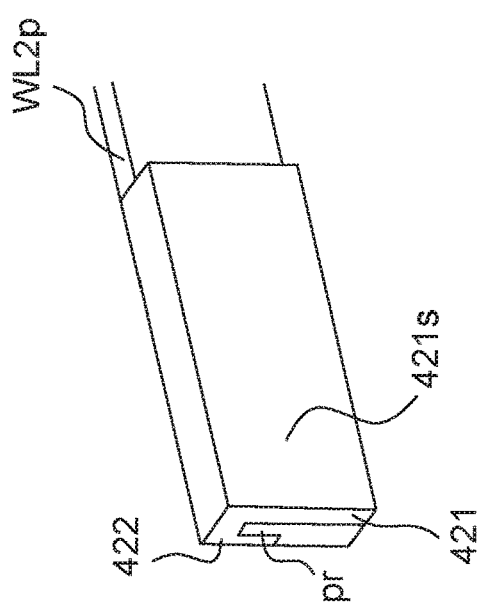
FIGS. 10A, 10B and 10C are each a perspective view of a restriction member according to a modification of the present disclosure.
Figure 10B:
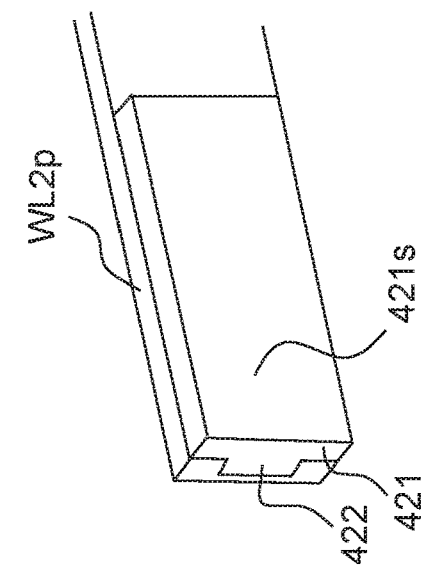
Figure 10A:
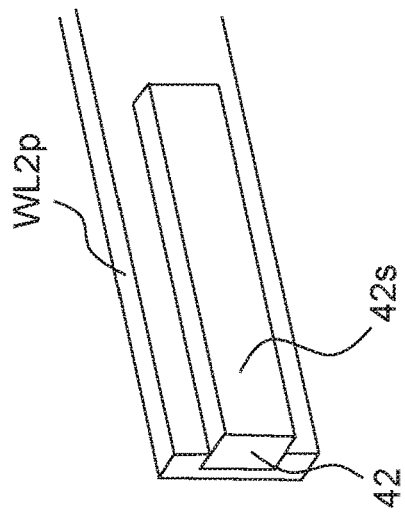

A second restriction member 42 of First Modification may have a rectangular column shape as depicted in FIG. 10A. The second restriction member 42 of First Modification has a restriction surface 42s extending in the longitudinal direction along the central axis thereof. Substantially half an area, of the second restriction member 42 of First Modification, which includes a surface on the opposite side to the regulating surface 42s is fitted into a recessed groove provided on the inner surface of the second protrusion WL2p along the front-rear direction, to thereby detachably attach the second restriction member 42 to the placement part 30.

A second restriction member 42 of Second Modification has a main body part 421 having a rectangular plate shape and including a restriction surface 421s, and a connecting part 422 which has a ridge-like shape and which extends in the longitudinal direction of the main body part 421, on a surface of the main body part 421 on a side opposite to the restriction surface 421s, as depicted in FIG. 10B. The connecting part 422 is fitted into a recessed groove provided on the inner surface of the second protrusion WL2p along the front-rear direction, to thereby detachably attach the second restriction member 42 of Second Modification to the placement part 30.

A second restriction member 42 of Third Modification has a main body part 421 having a rectangular plate shape and including a restriction surface 421s, and a connecting part 422 which is provided on an upper edge of a surface, of the main body part 421, on a side opposite to the restriction surface 421s, as depicted in FIG. 10C. The connecting part 422 extends in the longitudinal direction of the main body part 421 and has a cross-sectional shape which is substantially L-shaped. The second restriction member 42 of Third Modification is made to catch on (hook on) a protrusion pr provided on the upper surface, of the second protrusion WL2p, which is formed to be sunken or recessed by one stage (one step) in the vicinity of the front ends thereof, to thereby detachably attach the second restriction member 42 to the placement part 30.

In the first and second restriction members 41 and 42 of the first embodiment and the above-described modifications, the thicknesses (the size in the direction orthogonal to the restriction surfaces 411s and 421s) of the main body parts 411 and 412 may be changed or varied in the longitudinal direction. By attaching such first and second restriction members 41 and 42 to the first and second protrusions WL1p and WL2p, respectively, of the placement part 30, then the width of a gap defined between the restriction surface 411s and the restriction surface 421s can be made to be great on the front side and to be smaller progressively toward the rear side. In other words, it is possible to form an opening defined between first and second long walls WL1 and WL2 of the placement part 30 to have tapered shape. By doing so, it is possible to satisfactorily restrict the posture of the caster CT on the plate $P_{30}$, while performing the placement of the caster CT more easily.

Figure 11A:
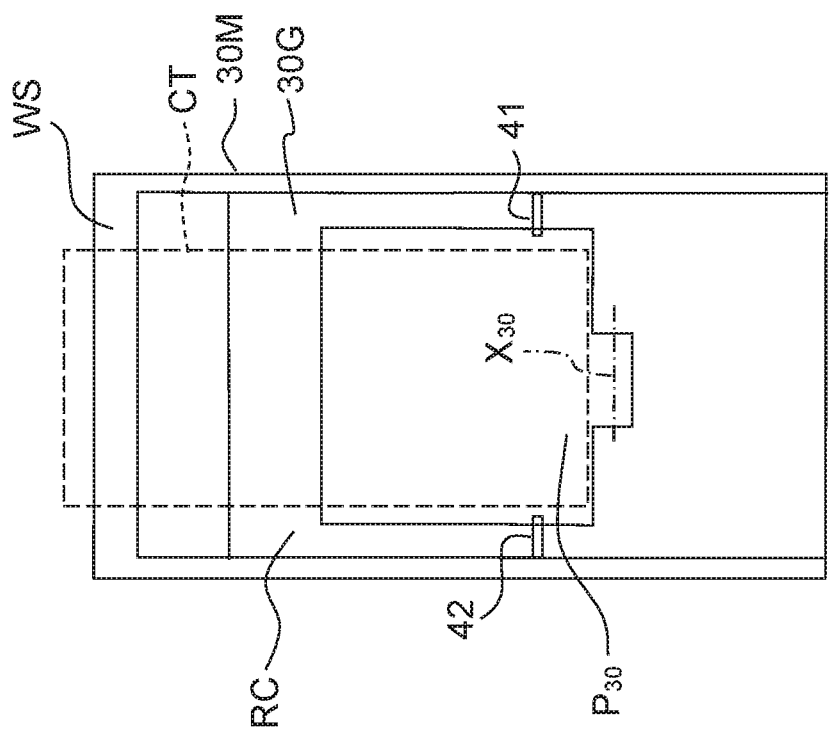
FIGS. 11A and 11B are each a plan view of a restriction member according to a further modification of the present disclosure.

The first and second restriction members 41 and 42 of the first embodiment and the respective modifications may have any size and shape and may be attached to the placement part 30 in any aspect or manner, as long as at least a portion or part of the caster CT which is placed on the plate $P_{30}$ in contact with the short wall WS is positioned in the gap defined between the restriction surfaces of the first and second regulating members 41 and 42 such that the posture of the caster CT is restricted. For example, as depicted in FIG. 11A, it is allowable to adopt a size and an attaching method such that the restriction surfaces 411s and 421s are present only in the vicinity of the front end of the plate $P_{30}$.

Figure 11B:
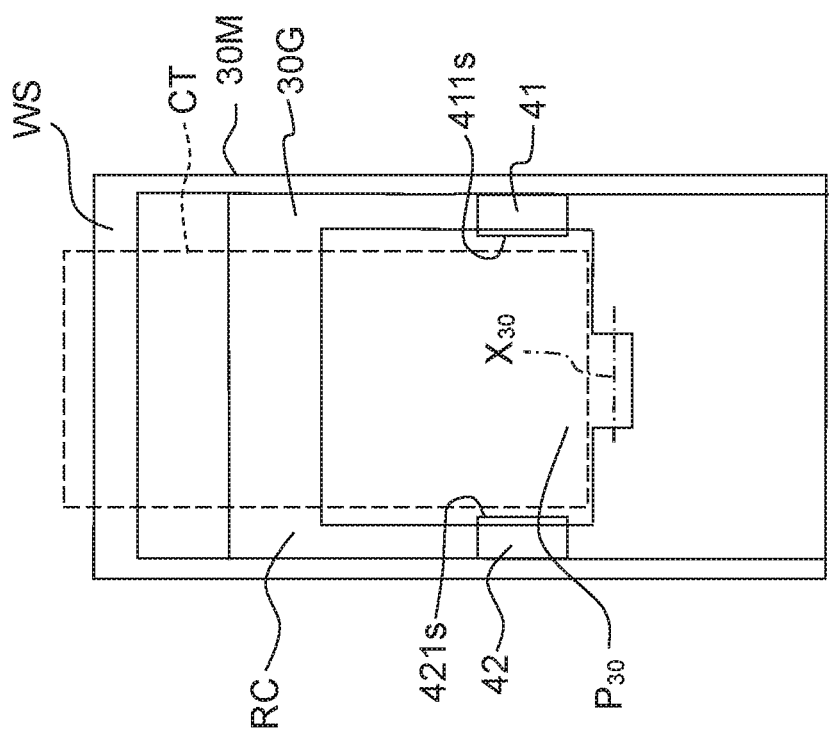

Further, as depicted in FIG. 11B, it is also allowable that the first and second restriction members 41 and 42 is formed to have a stick or bar-like shape, and that a restriction point at a tip end of each of the stick-like shaped first and second restriction members 41 and 42 restricts the change in the advancing direction of the caster CT. Alternatively, it is also allowable to make the size in the up-down direction of the second restriction member 42 depicted in FIG. 10A is made smaller and that a restriction line extending in the front-rear direction restricts the change in the advancing direction of the caster CT. Namely, each of the first and second restriction members 41 and 42 is capable of restricting the posture of the caster CT with any of a point-like portion, line-like portion and surface-like portion.

It is allowable to attach, to the load detector 100 of the first embodiment, only either one of the first and second restriction members 41 and 42. In such a case, the caster CT placed on the placement part 30 is positioned in a gap defined between one of the first and second restriction members 41 and 42 and one of the first and second long walls WL1 and WL2, and the posture of the caster CT placed on the placement part 30 is restricted by the one of the first and second restriction members 41 and 42 and the one of the first and second long walls WL1 and WL2.

Note that the first and second restriction members 41 and 42 are not limited to or restricted by being made of a resin, and may be formed of another material such as metal, etc., different from the resin. In a case that the first and second restriction members 41 and 42 are made of a metal, it is preferred that a resin coating, etc., is applied to a portion of each of the first and second restriction members 41 and 42 which makes contact with the caster CT in order to avoid any damage to the caster CT.

In the load detector 100 of the first embodiment, it is allowable to use a placement part having the following shape, instead of using the placement part 30.

In the load detector 100 of the first embodiment, the first arm AM1 and the second arm AM2 of the lever $LV_{30}$ of the guide 30G of the placement part 30 may be connected to the slope $SL_{30}$ in the vicinity of the central portion in the longitudinal direction of the slope $SL_{30}$. Further, any one of the first arm AM1 and the second arm AM2 may be omitted. The number of arm(s) and the arrangement thereof may be changed so that the rolling body placed on the placement part 30 does not apply an unnecessary load to the guide 30G via the arm(s).

Figure 12:
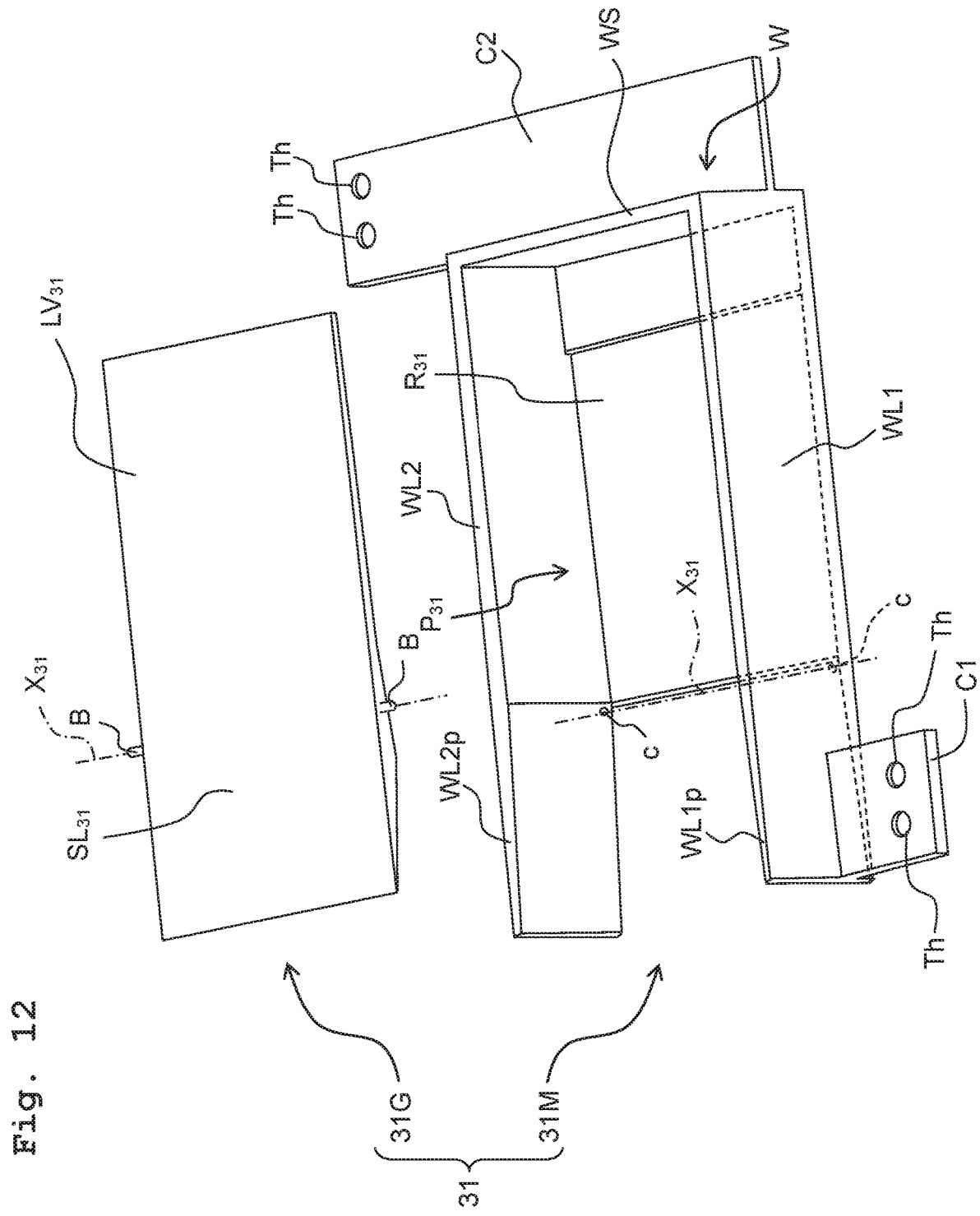
FIG. 12 is an exploded perspective view of a placement part according to a first modification of the present disclosure.

A placement part 31 of First Modification is depicted in FIG. 12. The placement part 31 of First Modification is identical to the placement part 30 of the first embodiment, except that a lever $LV_{31}$ of a guide 31G is a rectangular flat plate having no opening, that a recess $R_{31}$ having a rectangular shape in plan view is provided in a plate $P_{31}$ of a main body 31M instead of the recess $R_{30}$ having substantially the C-shape in plan view, and that the guide 31G is connected to the main body 31M by fitting bosses B provided in a slope $SL_{31}$ into recess holes c provided in the wall W of the main body 31M.

Figure 13:
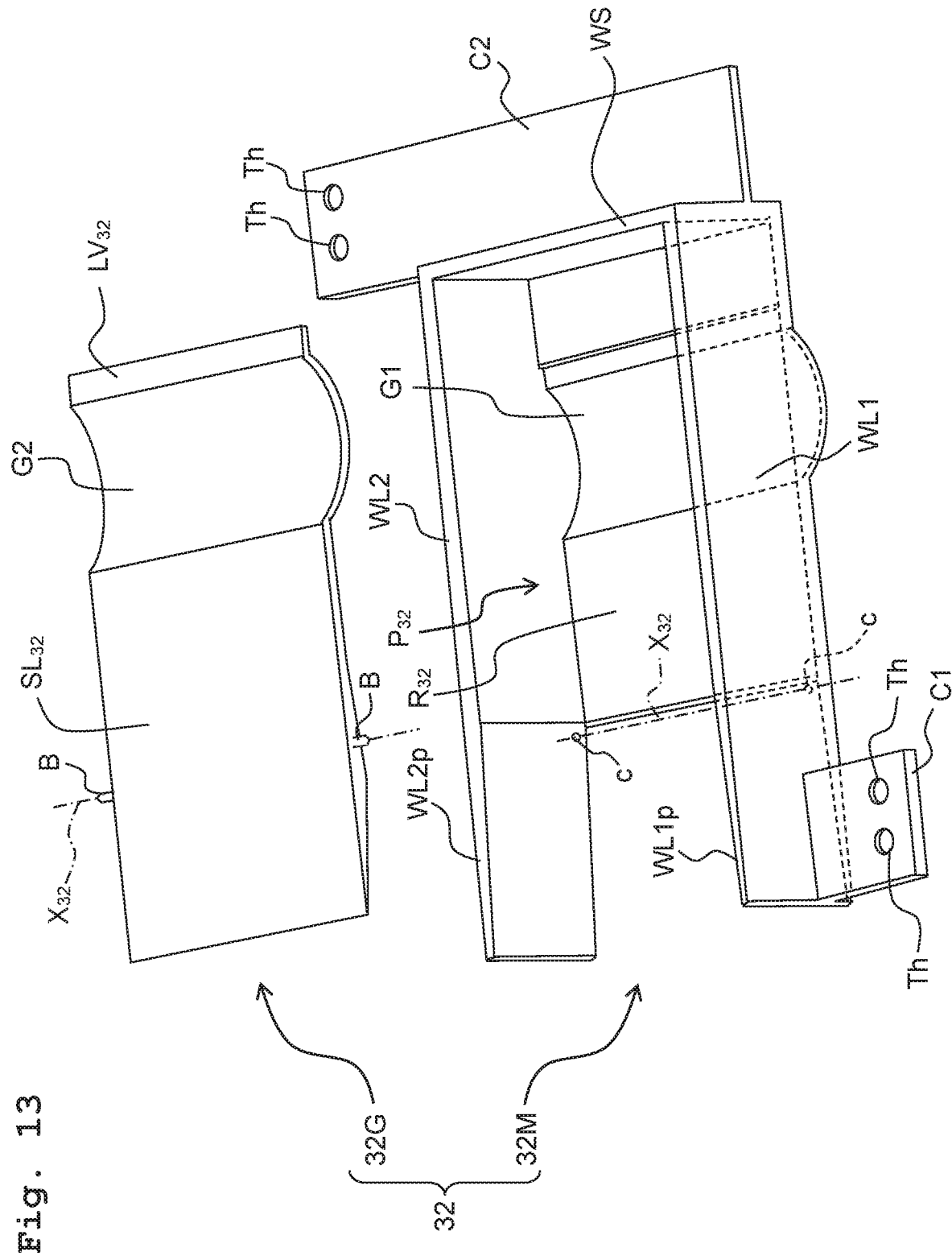
FIG. 13 is an exploded perspective view of a placement part according to a second modification of the present disclosure.

A placement part 32 of Second Modification is depicted in FIG. 13. The placement part 32 of Second Modification is identical to the placement part 31 of First Modification, except that a groove G1 having an arc-like shape and extending in the short-side direction of a plate $P_{32}$ of a main body 32M is provided in a recess $R_{32}$, which has a rectangular shape in plan view, of the plate $P_{32}$, and that a groove (movement restriction part) G2 which has an arc-like shape and of which shape and arrangement correspond to those of the groove G1, is provided in a lever $LV_{32}$ of a guide 32G. The caster CT placed on the plate $P_{32}$ is fitted into the groove G2 and thus any movement of the caster CT is restricted.

Figure 14:
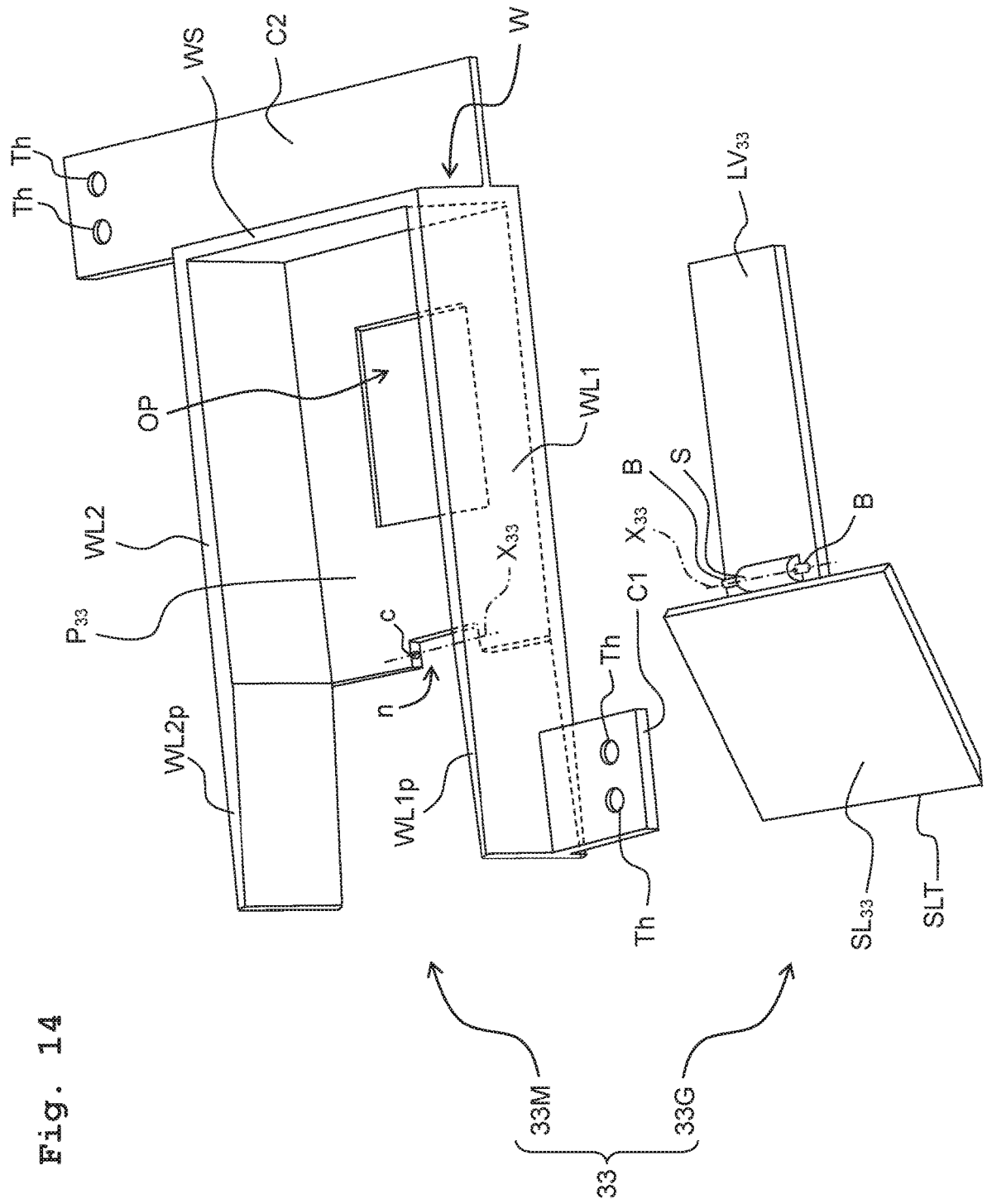
FIG. 14 is an exploded perspective view of a placement part according to a third modification of the present disclosure.

A placement part 33 of Third Modification is depicted in FIG. 14. The placement part 33 of Third Modification is mainly different from the placement part 30 in that a lever $LV_{33}$ of a guide 33G is a member which is rectangular in plan view and is disposed below a main body 33M, and that a plate $P_{33}$ of the main body 33M is a flat plate having an opening OP. The guide 33G is attached to the main body 33M so that the guide 33G is swingable about a swing axis $X_{33}$, by fitting bosses B protruding from an axis support part S provided on the lever $LV_{33}$ into a pair of recessed holes c of a notch n provided on the plate $P_{33}$ of the main body 33M, thereby arranging the lever $LV_{33}$ at a position below the opening OP. The caster CT placed on the plate $P_{33}$ is fitted into the opening OP to thereby push the lever $LV_{33}$ downward, which in turn separates a lower end (forward end SLT) of a slope $SL_{33}$ from the floor surface F.

Figure 15:
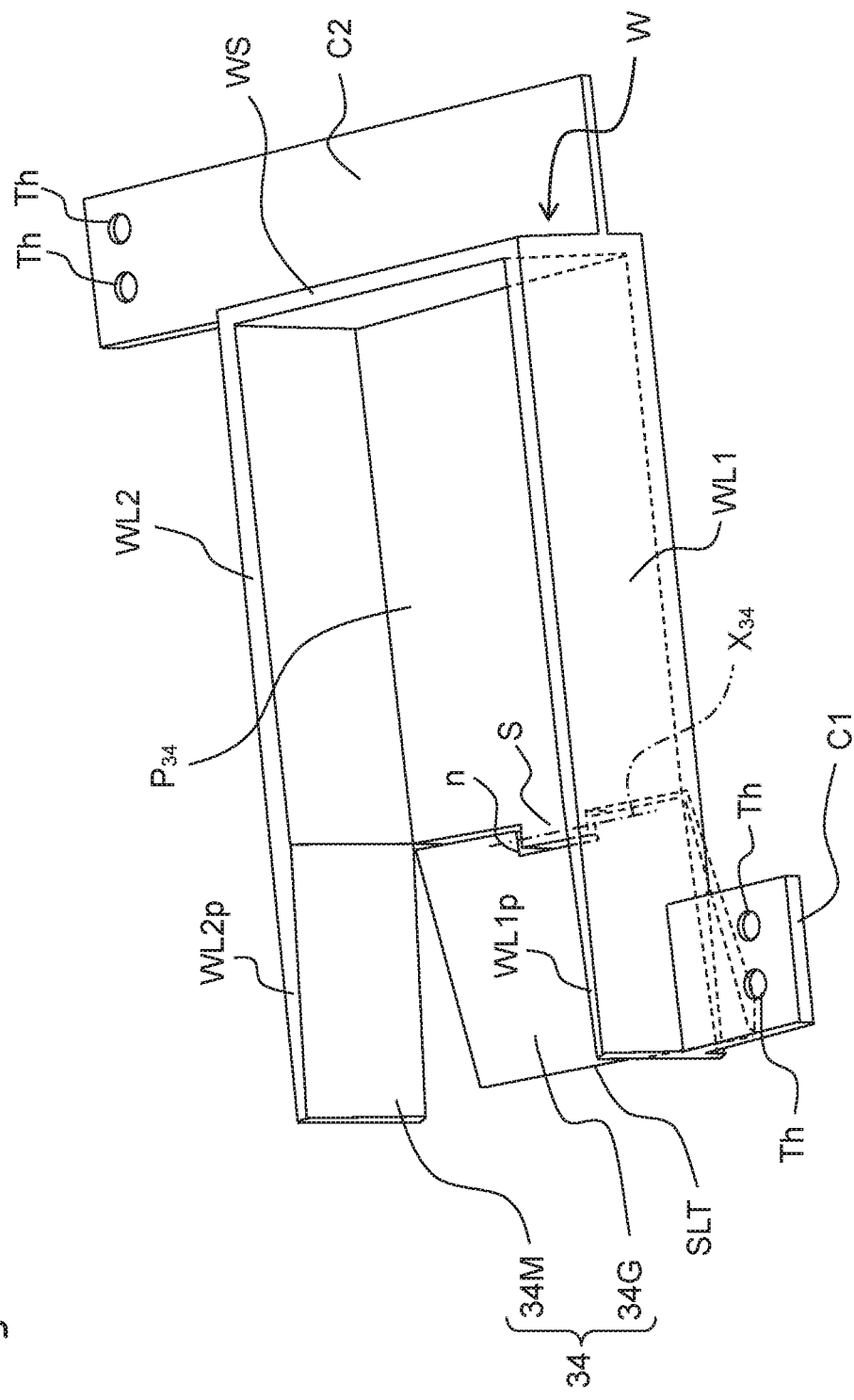
FIG. 15 is a perspective view of a placement part according to a fourth modification of the present disclosure.

A placement part 34 of Fourth Modification is depicted in FIG. 15. The placement part 34 of Fourth Modification is identical to the placement part 30, except that a guide 34G has no lever, no recess is formed on the upper surface of a plate $P_{34}$ of a main body 34M, and an urging (biasing) member which urges (biases) a forward end SLT of the guide 34G upward is provided. Specifically, the urging member is a torsion spring(s) (not depicted in the drawings) that is/are disposed to surround bosses (not depicted in the drawings) protruding from an axis support part S. In a case that the caster CT is to be placed on the plate $P_{34}$, the caster CT pushes the forward end SLT of the guide 34G downward to the floor surface F.

The following modifications can be applied to each of the above-described embodiment and modifications.

In each of the placement parts 30, 31, 32, 33, and 34 of the above-described embodiment and modifications, it is not necessarily indispensable to arrange the first connection part C1 and the second connection part C2 on the diagonal line of (diagonally across) each of the plates $P_{30}$, $P_{31}$, $P_{32}$, $P_{33}$ and $P_{34}$, provided that the first connection part C1 and the second connection part C2 are arranged with each of the plates $P_{30}$, $P_{31}$, $P_{32}$, $P_{33}$ and $P_{34}$ intervening therebetween in the diagonal direction.

It is not necessarily indispensable to attach the first connection part C1 of each of the placement parts 30, 31, 32, 33 and 34 of the above-described embodiment and modifications to a location in the vicinity of the free end 21s2 of the flexure element 21s of the first load cell 21. The first connection part C1 may be attached to the flexure element 21s of the first load cell 21 to a location on a side of the free end 21s2 relative to the central portion in the longitudinal direction of the flexure element 21s.

Alternatively, the first connection part C1 may also be attached to the flexure element 21s of the first load cell 21 at any location on the side of the free end 21s2 relative to the thin part(s) 21th. The second connection part C2 may also be attached to the flexure element 22s of the second load cell 22, in a similar manner as regarding the first connection part C1. The second connection part C2 may be attached to the flexure element 22s of the second load cell 22 at a location on the side of the free end 22s2 relative to the central portion in the longitudinal direction of the flexure element 22s.

In the placement parts 30, 31, 32 and 33 according to the first embodiment and the first to third modifications, the slopes $SL_{30}$, $SL_{31}$, $SL_{32}$ and $SL_{33}$ of the guides 30G, 31G, 32G and 33G are caused to move to the positions at which each of the slopes is brought into contact with the floor surface F, due to the self-weight thereof. The present disclosure, however, is not limited to this configuration. An urging member (e.g., a torsion spring, a plate spring, a magnet, etc.) which urges the forward end SLT of the slope $SL_{30}$, $SL_{31}$, $SL_{32}$ or $SL_{33}$ downward may be provided between the main body 30M, 31M, 32M or 33M and the guide 30G, 31G, 32G, or 33G of the placement parts 30, 31, 32 or 33. Alternatively, a weight may be attached to the slope $SL_{30}$, $SL_{31}$, $SL_{32}$ or $SL_{33}$ of the guide 30G, 31G, 32G, or 33G, thereby moving the forward end SLT of the slope $SL_{30}$, $SL_{31}$, $SL_{32}$ or $SL_{33}$ downward.

In the load detector 100, although the first load cell 21 and the second load cell 22 face each other in parallel, it is allowable that the first load cell 21 and the second load cell 22 face each other while defining an angle smaller than about 5° therebetween.

The load detector of each of the embodiment and modifications may be used with respect to any rolling body (rolling element), instead of being used with respect to the castor CT.

Second Embodiment

Figure 16:
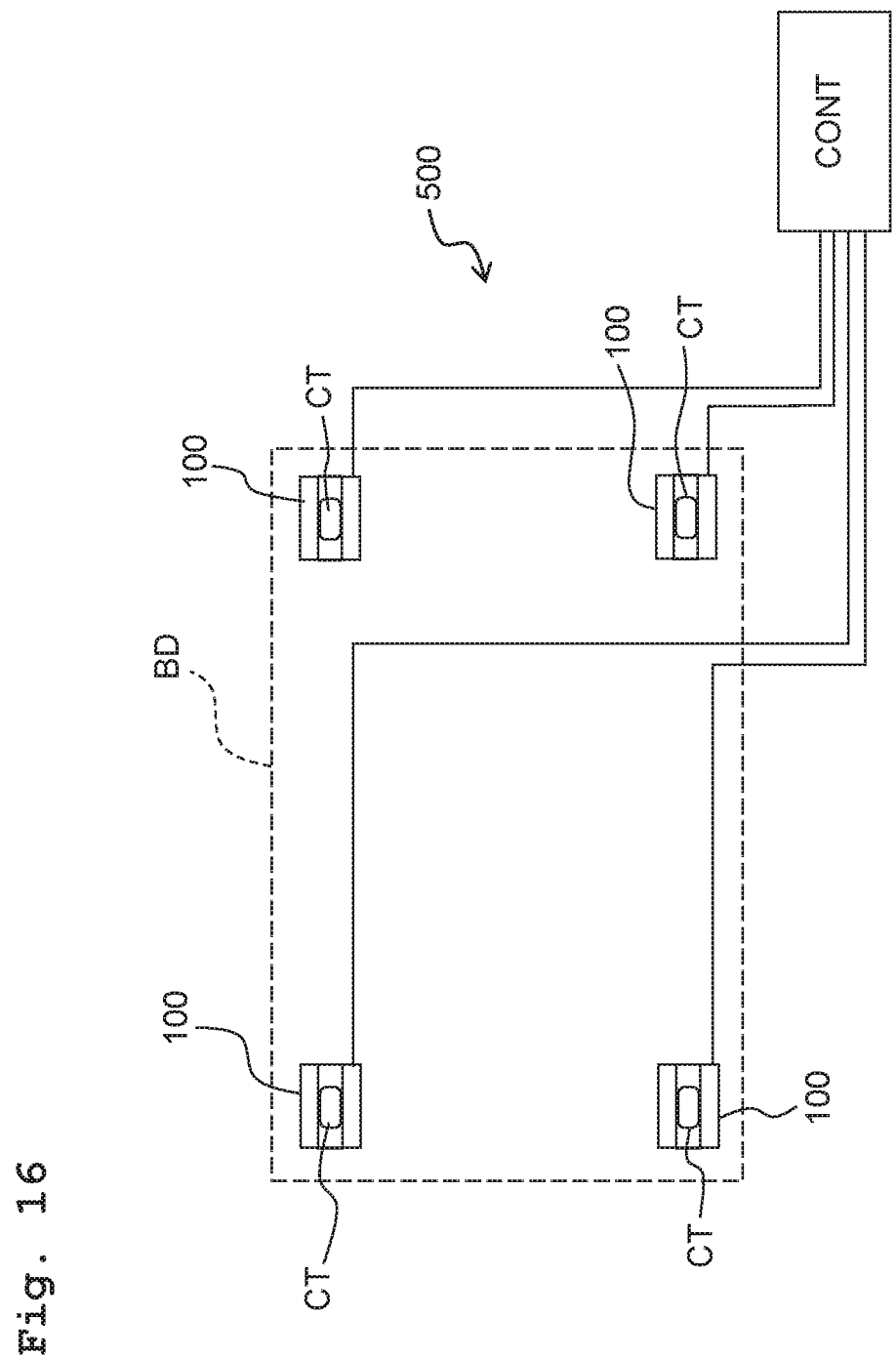
FIG. 16 is a schematic view depicting the configuration of a load detection system according to a second embodiment of the present disclosure.

Referring to FIG. 16, an explanation will be given about a load detection system 500 according to a Second embodiment.

The load detection system 500 mainly includes four load detectors 100 and a controller CONT. The four load detectors 100 are connected to the controller CONT by wiring.

In a case that the load detection system 500 is used, four casters CT attached respectively to four legs of a bed BD are placed respectively on the placement parts 30 of the four load detectors 100 (FIG. 4B). This allows each of the four load detectors 100 to detect a part of the load, of a human subject on the bed BD, which is applied to each of the load detectors 100 via one of the legs, of the bed BD, corresponding thereto.

The controller CONT connected to the four load detectors 100 executes a load calculation processing of summing up the output from the first load cell 21 and the output from the second load cell 22 of each of the load detectors 100, and of subtracting a predetermined value corresponding to the position deviation error, and a load summing-up processing of summing up the loads detected by the respective load detectors 100. The controller CONT may further execute any other processing.

Since the load detection system of the present embodiment uses the load detector 100 including the placement part 30 and the first and second restriction members 41 and 42 according to the first embodiment, it is possible to obtain the same effects as those obtained by the placement part 30 and the first and second restriction members 41 and 42 according to the first embodiment. In particular, since the bed BD can be placed on the four placement parts 30, only by moving the bed BD in one direction so as to cause the four casters CT of the bed BD to rotate and to run up on the slopes $SL_{30}$ of the guides 30M, it is possible to achieve the effect that the placement of the bed BD on the load detectors 100 can be performed with less trouble and less labor. Further, since the first and second restriction members 41 and 42 restrict the posture of each of the casters CT on the placement part 30, there is no need to adjust the advancing direction of each of the casters CT to be oriented toward the floor surface when the casters CT are to be lowered onto the floor surface.

Note that in the load detection system of the present embodiment, the number of the load detector 100 is not limited to or restricted by 4 (four); the number of the load detector 100 may be not more than 3 (three), or not less than 5 (five). Further, the load detector 100 may include the placement part 31, 32, 33, 34 of each of the modifications, instead of including the placement part 30.

Note that in the load detection system of the present embodiment, the output from each of the load detectors 100 may be transmitted to the controller CONT wirelessly, rather than via wiring. Further, the controller CONT may be connected to an indicator configured to indicate the load determined by the controller CONT, a notifying device or unit configured to perform a predetermined notification based on the determined load, etc.

The present invention is not limited to or restricted by the above-described embodiments, provided that the characteristics of the present invention are maintained. The present invention also includes any other embodiments which can be conceived in the range of the technical ideas of the present invention.

In the load detector of the above embodiments, the restriction member may include a pair of restriction parts; and the pair of restriction parts may be detachably attached to the pair of walls, respectively.

In the load detector of the above embodiments, the restriction member may have a restriction surface configured to restrict the posture of the rolling body.

In the load detector of the above embodiments, the placement part may have a placement plate on which the rolling body is to be placed and a slope which is configured to guide the rolling body onto the placement plate; and the slope may be swingable about a predetermined swing axis between a first position at which a forward end of the slope makes contact with an installation surface having the load detector installed thereon, and a second position at which the forward end is separated away from the installation surface.

The load detector of the above embodiments may further include a lever which extends from the slope to an opposite side of the forward end with respect to the swing axis of the slope so as to be located above the placement plate.

In the load detection kit of the above embodiments, each of the first restriction member and the second restriction member may have a pair of restriction parts; and the pair of restriction parts may be detachably attached to the pair of walls, respectively.

According to the load detector, the load detection kit and the load detection system of the above embodiments, casters of various sizes can be easily placed onto the placement part and can be easily moved from the placement part to the floor surface.

The invention claimed is:

1. A load detector, comprising:
   a first load cell which is supported on a first support base in a cantilever manner to have a free end;
   a second load cell which is disposed to face the first load cell and which is supported on a second support base in a cantilever manner to have a free end;
   a placement part on which a rolling body is to be placed, and which includes a first connection part connected to the first load cell, a second connection part connected to the second load cell, and a pair of walls, the placement part being disposed between the first load cell and the second load cell; and
   a restriction member which is detachably attached to at least one of the pair of walls of the placement part, and which is configured to restrict a posture of the rolling body on the placement part,
   wherein the free end of the first load cell and the free end of the second load cell face opposite directions to each other in an extending direction of the first load cell, and
   the first connection part of the placement part is connected to the first load cell on a side of the free end of the first load cell and the second connection part of the placement part is connected to the second load cell on a side of the free end of the second load cell.

2. The load detector according to claim 1, wherein the restriction member includes a pair of restriction parts; and the pair of restriction parts are detachably attached to the pair of walls, respectively.

3. The load detector according to claim 1, wherein the restriction member has a restriction surface configured to restrict the posture of the rolling body.

4. The load detector according to claim 1, wherein the placement part has a placement plate on which the rolling body is to be placed and a slope which is configured to guide the rolling body onto the placement plate; and
   the slope is swingable about a predetermined swing axis between a first position at which a forward end of the slope makes contact with an installation surface having the load detector installed thereon, and a second position at which the forward end is separated away from the installation surface.

5. The load detector according to claim 4, further comprising a lever which extends from the slope to an opposite side of the forward end with respect to the swing axis of the slope so as to be located above the placement plate.

6. A load detection kit comprising:
   a load detector configured to detect a load of a subject including a rolling body; and
   a plurality of restriction members which are selectively used depending on a width of the rolling body,
   the load detector including:
   a first load cell which is supported on a first support base in a cantilever manner to have a free end;
   a second load cell which is disposed to face the first load cell and which is supported on a second support base in a cantilever manner to have a free end; and
   a placement part on which a rolling body is to be placed, and which includes a first connection part connected to the first load cell, a second connection part connected to the second load cell, and a pair of walls, the placement part being disposed between the first load cell and the second load cell,
   wherein the free end of the first load cell and the free end of the second load cell face opposite directions to each other in an extending direction of the first load cell, and
   the first connection part of the placement part is connected to the first load cell on a side of the free end of the first load cell and the second connection part of the placement part is connected to the second load cell on a side of the free end of the second load cell;
   wherein the plurality of restriction members include at least a first restriction member and a second restriction member; and
   one of the first restriction member and the second restriction member is detachably attached to at least one of the pair of walls of the placement part so as to restrict a posture of the rolling body on the placement part.

7. The load detection kit according to claim 6, wherein each of the first restriction member and the second restriction member has a pair of restriction parts; and
   the pair of restriction parts are detachably attached to the pair of walls, respectively.

8. A load detection system configured to detect a load of a human subject on a bed, the system comprising:
   a plurality of load detectors each of which is the load detector as defined in claim 1, each of the plurality of load detectors being disposed under each of the legs of the bed; and
   a controller which is connected to the plurality of load detectors and which is configured to calculate the load of the human subject based on an output of the load detector.

* * * * *